United States Patent
Arakawa

(10) Patent No.: US 8,508,792 B2
(45) Date of Patent: Aug. 13, 2013

(54) IMAGE PROCESSING APPARATUS, AN IMAGE PROCESSING METHOD, AND A PROGRAM THEREOF FOR HANDLING A COPY-FORGERY-INHIBITED PATTERN IMAGE

(75) Inventor: Junya Arakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1294 days.

(21) Appl. No.: 12/144,983

(22) Filed: Jun. 24, 2008

(65) Prior Publication Data

US 2009/0009782 A1    Jan. 8, 2009

(30) Foreign Application Priority Data

Jul. 3, 2007  (JP) .................................. 2007-175415

(51) Int. Cl.
G06K 1/00   (2006.01)
B42D 15/00   (2006.01)

(52) U.S. Cl.
USPC ............ 358/1.9; 358/3.28; 283/902; 382/100

(58) Field of Classification Search
None
See application file for complete search history.

(56) References Cited

U.S. PATENT DOCUMENTS

| 7,738,143 B2 * | 6/2010 | Ishimoto et al. | 358/3.28 |
| 2003/0179412 A1 * | 9/2003 | Matsunoshita | 358/3.28 |
| 2005/0058476 A1 * | 3/2005 | Murakami | 399/366 |

FOREIGN PATENT DOCUMENTS

| JP | 2001-197297 | 7/2001 |
| JP | 2006-229316 | 8/2006 |

* cited by examiner

*Primary Examiner* — Gabriel Garcia
*Assistant Examiner* — Pawandeep Dhingra
(74) *Attorney, Agent, or Firm* — Fitzpatrick, Cella, Harper & Scinto

(57) ABSTRACT

In prior art, there are some occasions where functions of a copy-forgery-inhibited pattern are impaired when printed on a sheet after rotation because of the level difference appearing between the density level of a latent image portion and the density level of a background portion of a copy-forgery-inhibited pattern. To cope with the problem, the image processing apparatus which has a generating unit for generating copy-forgery-inhibited pattern image data and a rotation unit for rotating the generated copy-forgery-inhibited pattern image data, wherein the generating unit generates the copy-forgery-inhibited pattern image data to be rotated by the rotation unit in accordance with a rotation angle in the rotation unit.

9 Claims, 35 Drawing Sheets

(a) 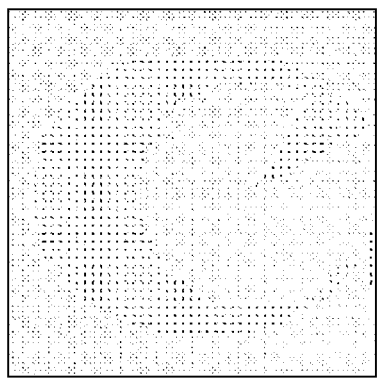
VISUALIZING
(b) 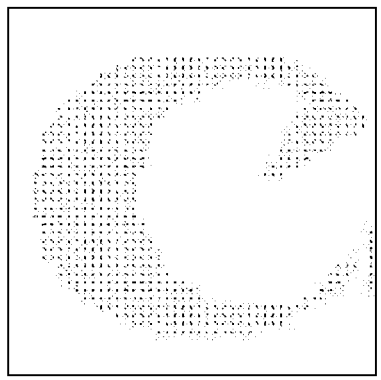
FIG.15

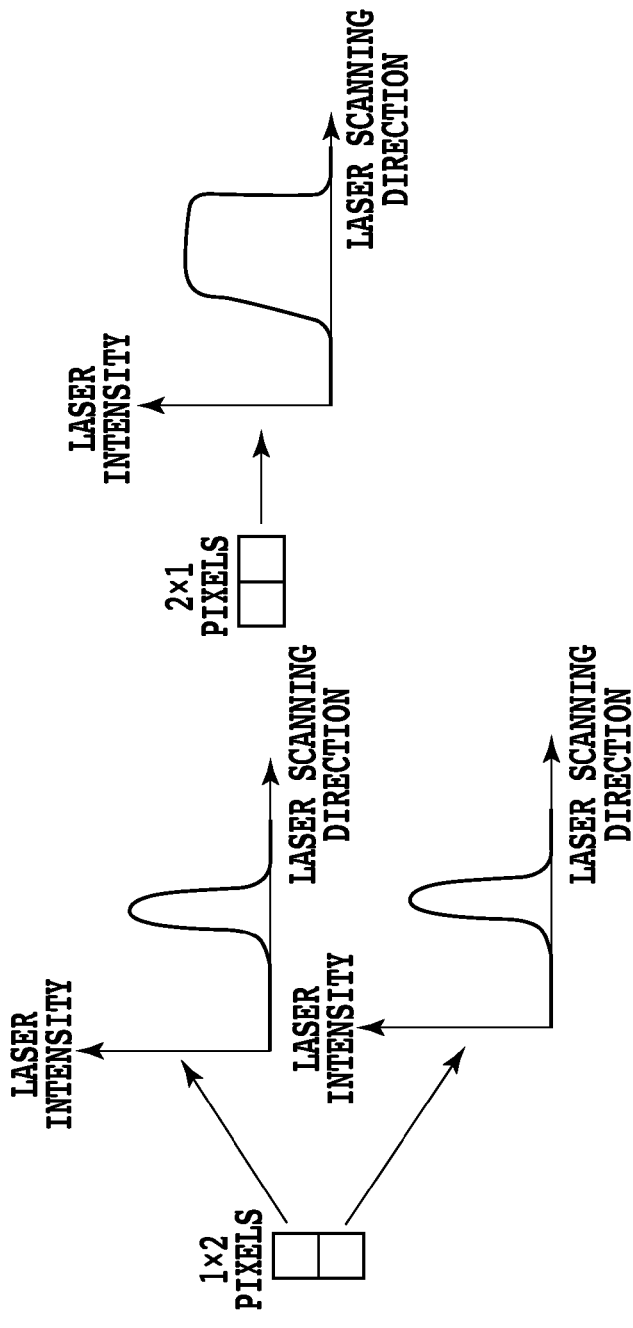
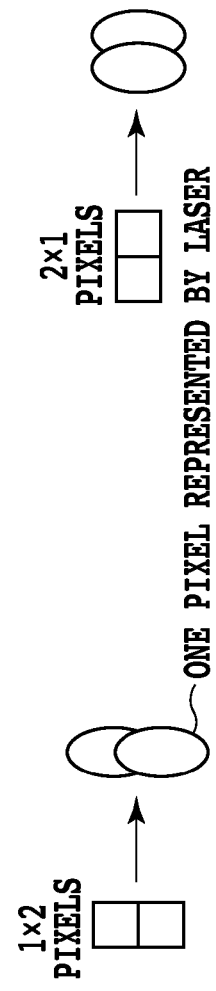
FIG.16A TRANSIENT RESPONSE CHARACTERISTICS OF LASER (CONCEPTUAL DIAGRAM)
FIG.16B ASYMMETRY OF LASER SPOT DIAMETER (CONCEPTUAL DIAGRAM)

1701(FOR 0 DEGREE)

| 0 | 128 | 32 | 160 | 8 | 136 | 40 | 168 | 2 | 130 | 34 | 162 | 10 | 138 | 42 | 170 |
|---|---|---|---|---|---|---|---|---|---|---|---|---|---|---|---|
| 192 | 64 | 224 | 96 | 200 | 72 | 232 | 104 | 194 | 66 | 226 | 98 | 202 | 74 | 234 | 106 |
| 48 | 176 | 16 | 144 | 56 | 184 | 24 | 152 | 50 | 178 | 18 | 146 | 58 | 186 | 26 | 154 |
| 240 | 112 | 208 | 80 | 248 | 120 | 216 | 88 | 242 | 114 | 210 | 82 | 250 | 122 | 218 | 90 |
| 12 | 140 | 44 | 172 | 4 | 132 | 36 | 164 | 14 | 142 | 46 | 174 | 6 | 134 | 38 | 166 |
| 204 | 76 | 236 | 108 | 196 | 68 | 228 | 100 | 206 | 78 | 238 | 110 | 198 | 70 | 230 | 102 |
| 60 | 188 | 28 | 156 | 52 | 180 | 20 | 148 | 62 | 190 | 30 | 158 | 54 | 182 | 22 | 150 |
| 252 | 124 | 220 | 92 | 244 | 116 | 212 | 84 | 254 | 126 | 222 | 94 | 246 | 118 | 214 | 86 |
| 3 | 131 | 35 | 163 | 11 | 139 | 43 | 171 | 1 | 129 | 33 | 161 | 9 | 137 | 41 | 169 |
| 195 | 67 | 227 | 99 | 203 | 75 | 235 | 107 | 193 | 65 | 225 | 97 | 201 | 73 | 233 | 105 |
| 51 | 179 | 19 | 147 | 59 | 187 | 27 | 155 | 49 | 177 | 17 | 145 | 57 | 185 | 25 | 153 |
| 243 | 115 | 211 | 83 | 251 | 123 | 219 | 91 | 241 | 113 | 209 | 81 | 249 | 121 | 217 | 89 |
| 15 | 143 | 47 | 175 | 7 | 135 | 39 | 167 | 13 | 141 | 45 | 173 | 5 | 133 | 37 | 165 |
| 207 | 79 | 239 | 111 | 199 | 71 | 231 | 103 | 205 | 77 | 237 | 109 | 197 | 69 | 229 | 101 |
| 63 | 191 | 31 | 159 | 55 | 183 | 23 | 151 | 61 | 189 | 29 | 157 | 53 | 181 | 21 | 149 |
| 255 | 127 | 223 | 95 | 247 | 119 | 215 | 87 | 253 | 125 | 221 | 93 | 245 | 117 | 213 | 85 |

FIG.17A

1702 (FOR 90 DEGREE)

| 170 | 106 | 154 | 90 | 166 | 102 | 150 | 86 | 169 | 105 | 153 | 89 | 165 | 101 | 149 | 85 |
|---|---|---|---|---|---|---|---|---|---|---|---|---|---|---|---|
| 42 | 234 | 26 | 218 | 38 | 230 | 22 | 214 | 41 | 233 | 25 | 217 | 37 | 229 | 21 | 213 |
| 138 | 74 | 186 | 122 | 134 | 70 | 182 | 118 | 137 | 73 | 185 | 121 | 133 | 69 | 181 | 117 |
| 10 | 202 | 58 | 250 | 6 | 198 | 54 | 246 | 9 | 201 | 57 | 249 | 5 | 197 | 53 | 245 |
| 162 | 98 | 146 | 82 | 174 | 110 | 158 | 94 | 161 | 97 | 145 | 81 | 173 | 109 | 157 | 93 |
| 34 | 226 | 18 | 210 | 46 | 238 | 30 | 222 | 33 | 225 | 17 | 209 | 45 | 237 | 29 | 221 |
| 130 | 66 | 178 | 114 | 142 | 78 | 190 | 126 | 129 | 65 | 177 | 113 | 141 | 77 | 189 | 125 |
| 2 | 194 | 50 | 242 | 14 | 206 | 62 | 254 | 1 | 193 | 49 | 241 | 13 | 205 | 61 | 253 |
| 168 | 104 | 152 | 88 | 164 | 100 | 148 | 84 | 171 | 107 | 155 | 91 | 167 | 103 | 151 | 87 |
| 40 | 232 | 24 | 216 | 36 | 228 | 20 | 212 | 43 | 235 | 27 | 219 | 39 | 231 | 23 | 215 |
| 136 | 72 | 184 | 120 | 132 | 68 | 180 | 116 | 139 | 75 | 187 | 123 | 135 | 71 | 183 | 119 |
| 8 | 200 | 56 | 248 | 4 | 196 | 52 | 244 | 11 | 203 | 59 | 251 | 7 | 199 | 55 | 247 |
| 160 | 96 | 144 | 80 | 172 | 108 | 156 | 92 | 163 | 99 | 147 | 83 | 175 | 111 | 159 | 95 |
| 32 | 224 | 16 | 208 | 44 | 236 | 28 | 220 | 35 | 227 | 19 | 211 | 47 | 239 | 31 | 223 |
| 128 | 64 | 176 | 112 | 140 | 76 | 188 | 124 | 131 | 67 | 179 | 115 | 143 | 79 | 191 | 127 |
| 0 | 192 | 48 | 240 | 12 | 204 | 60 | 252 | 3 | 195 | 51 | 243 | 15 | 207 | 63 | 255 |

FIG.17B

1703(FOR 180 DEGREES)

| 85 | 213 | 117 | 245 | 93 | 221 | 125 | 253 | 87 | 215 | 119 | 247 | 95 | 223 | 127 | 255 |
|---|---|---|---|---|---|---|---|---|---|---|---|---|---|---|---|
| 149 | 21 | 181 | 53 | 157 | 29 | 189 | 61 | 151 | 23 | 183 | 55 | 159 | 31 | 191 | 63 |
| 101 | 229 | 69 | 197 | 109 | 237 | 77 | 205 | 103 | 231 | 71 | 199 | 111 | 239 | 79 | 207 |
| 165 | 37 | 133 | 5 | 173 | 45 | 141 | 13 | 167 | 39 | 135 | 7 | 175 | 47 | 143 | 15 |
| 89 | 217 | 121 | 249 | 81 | 209 | 113 | 241 | 91 | 219 | 123 | 251 | 83 | 211 | 115 | 243 |
| 153 | 25 | 185 | 57 | 145 | 17 | 177 | 49 | 155 | 27 | 187 | 59 | 147 | 19 | 179 | 51 |
| 105 | 233 | 73 | 201 | 97 | 225 | 65 | 193 | 107 | 235 | 75 | 203 | 99 | 227 | 67 | 195 |
| 169 | 41 | 137 | 9 | 161 | 33 | 129 | 1 | 171 | 43 | 139 | 11 | 163 | 35 | 131 | 3 |
| 86 | 214 | 118 | 246 | 94 | 222 | 126 | 254 | 84 | 212 | 116 | 244 | 92 | 220 | 124 | 252 |
| 150 | 22 | 182 | 54 | 158 | 30 | 190 | 62 | 148 | 20 | 180 | 52 | 156 | 28 | 188 | 60 |
| 102 | 230 | 70 | 198 | 110 | 238 | 78 | 206 | 100 | 228 | 68 | 196 | 108 | 236 | 76 | 204 |
| 166 | 38 | 134 | 6 | 174 | 46 | 142 | 14 | 164 | 36 | 132 | 4 | 172 | 44 | 140 | 12 |
| 90 | 218 | 122 | 250 | 82 | 210 | 114 | 242 | 88 | 216 | 120 | 248 | 80 | 208 | 112 | 240 |
| 154 | 26 | 186 | 58 | 146 | 18 | 178 | 50 | 152 | 24 | 184 | 56 | 144 | 16 | 176 | 48 |
| 106 | 234 | 74 | 202 | 98 | 226 | 66 | 194 | 104 | 232 | 72 | 200 | 96 | 224 | 64 | 192 |
| 170 | 42 | 138 | 10 | 162 | 34 | 130 | 2 | 168 | 40 | 136 | 8 | 160 | 32 | 128 | 0 |

FIG.17C

1704(FOR 270 DEGREES)

| 255 | 63 | 207 | 15 | 243 | 51 | 195 | 3 | 252 | 60 | 204 | 12 | 240 | 48 | 192 | 0 |
|---|---|---|---|---|---|---|---|---|---|---|---|---|---|---|---|
| 127 | 191 | 79 | 143 | 115 | 179 | 67 | 131 | 124 | 188 | 76 | 140 | 112 | 176 | 64 | 128 |
| 223 | 31 | 239 | 47 | 211 | 19 | 227 | 35 | 220 | 28 | 236 | 44 | 208 | 16 | 224 | 32 |
| 95 | 159 | 111 | 175 | 83 | 147 | 99 | 163 | 92 | 156 | 108 | 172 | 80 | 144 | 96 | 160 |
| 247 | 55 | 199 | 7 | 251 | 59 | 203 | 11 | 244 | 52 | 196 | 4 | 248 | 56 | 200 | 8 |
| 119 | 183 | 71 | 135 | 123 | 187 | 75 | 139 | 116 | 180 | 68 | 132 | 120 | 184 | 72 | 136 |
| 215 | 23 | 231 | 39 | 219 | 27 | 235 | 43 | 212 | 20 | 228 | 36 | 216 | 24 | 232 | 40 |
| 87 | 151 | 103 | 167 | 91 | 155 | 107 | 171 | 84 | 148 | 100 | 164 | 88 | 152 | 104 | 168 |
| 253 | 61 | 205 | 13 | 241 | 49 | 193 | 1 | 254 | 62 | 206 | 14 | 242 | 50 | 194 | 2 |
| 125 | 189 | 77 | 141 | 113 | 177 | 65 | 129 | 126 | 190 | 78 | 142 | 114 | 178 | 66 | 130 |
| 221 | 29 | 237 | 45 | 209 | 17 | 225 | 33 | 222 | 30 | 238 | 46 | 210 | 18 | 226 | 34 |
| 93 | 157 | 109 | 173 | 81 | 145 | 97 | 161 | 94 | 158 | 110 | 174 | 82 | 146 | 98 | 162 |
| 245 | 53 | 197 | 5 | 249 | 57 | 201 | 9 | 246 | 54 | 198 | 6 | 250 | 58 | 202 | 10 |
| 117 | 181 | 69 | 133 | 121 | 185 | 73 | 137 | 118 | 182 | 70 | 134 | 122 | 186 | 74 | 138 |
| 213 | 21 | 229 | 37 | 217 | 25 | 233 | 41 | 214 | 22 | 230 | 38 | 218 | 26 | 234 | 42 |
| 85 | 149 | 101 | 165 | 89 | 153 | 105 | 169 | 86 | 150 | 102 | 166 | 90 | 154 | 106 | 170 |

FIG.17D

1801(FOR 0 DEGREE)

| 210 | 211 | 212 | 213 | 214 | 215 | 216 | 217 | 218 | 219 | 220 | 221 | 222 | 223 | 224 | 225 |
|---|---|---|---|---|---|---|---|---|---|---|---|---|---|---|---|
| 209 | 156 | 157 | 158 | 159 | 160 | 161 | 162 | 163 | 164 | 165 | 166 | 167 | 168 | 169 | 226 |
| 208 | 155 | 110 | 111 | 112 | 113 | 114 | 115 | 116 | 117 | 118 | 119 | 120 | 121 | 170 | 227 |
| 207 | 154 | 109 | 72 | 73 | 74 | 75 | 76 | 77 | 78 | 79 | 80 | 81 | 122 | 171 | 228 |
| 206 | 153 | 108 | 71 | 42 | 43 | 44 | 45 | 46 | 47 | 48 | 49 | 82 | 123 | 172 | 229 |
| 205 | 152 | 107 | 70 | 41 | 20 | 21 | 22 | 23 | 24 | 25 | 50 | 83 | 124 | 173 | 230 |
| 204 | 151 | 106 | 69 | 40 | 19 | 6 | 7 | 8 | 9 | 26 | 51 | 84 | 125 | 174 | 231 |
| 203 | 150 | 105 | 68 | 39 | 18 | 5 | 0 | 1 | 10 | 27 | 52 | 85 | 126 | 175 | 232 |
| 202 | 149 | 104 | 67 | 38 | 17 | 4 | 3 | 2 | 11 | 28 | 53 | 86 | 127 | 176 | 233 |
| 201 | 148 | 103 | 66 | 37 | 16 | 15 | 14 | 13 | 12 | 29 | 54 | 87 | 128 | 177 | 234 |
| 200 | 147 | 102 | 65 | 36 | 35 | 34 | 33 | 32 | 31 | 30 | 55 | 88 | 129 | 178 | 235 |
| 199 | 146 | 101 | 64 | 63 | 62 | 61 | 60 | 59 | 58 | 57 | 56 | 89 | 130 | 179 | 236 |
| 198 | 145 | 100 | 99 | 98 | 97 | 96 | 95 | 94 | 93 | 92 | 91 | 90 | 131 | 180 | 237 |
| 197 | 144 | 143 | 142 | 141 | 140 | 139 | 138 | 137 | 136 | 135 | 134 | 133 | 132 | 181 | 238 |
| 196 | 195 | 194 | 193 | 192 | 191 | 190 | 189 | 188 | 187 | 186 | 185 | 184 | 183 | 182 | 239 |
| 255 | 254 | 253 | 252 | 251 | 250 | 249 | 248 | 247 | 246 | 245 | 244 | 243 | 242 | 241 | 240 |

FIG.18A

1802 (FOR 90 DEGREES)

| 225 | 226 | 227 | 228 | 229 | 230 | 231 | 232 | 233 | 234 | 235 | 236 | 237 | 238 | 239 | 240 |
|---|---|---|---|---|---|---|---|---|---|---|---|---|---|---|---|
| 224 | 169 | 170 | 171 | 172 | 173 | 174 | 175 | 176 | 177 | 178 | 179 | 180 | 181 | 182 | 241 |
| 223 | 168 | 121 | 122 | 123 | 124 | 125 | 126 | 127 | 128 | 129 | 130 | 131 | 132 | 183 | 242 |
| 222 | 167 | 120 | 81 | 82 | 83 | 84 | 85 | 86 | 87 | 88 | 89 | 90 | 133 | 184 | 243 |
| 221 | 166 | 199 | 80 | 49 | 50 | 51 | 52 | 53 | 54 | 55 | 56 | 91 | 134 | 185 | 244 |
| 220 | 165 | 118 | 79 | 48 | 25 | 26 | 27 | 28 | 29 | 30 | 57 | 92 | 135 | 186 | 245 |
| 219 | 164 | 117 | 78 | 47 | 24 | 9 | 10 | 11 | 12 | 31 | 58 | 93 | 136 | 187 | 246 |
| 218 | 163 | 116 | 77 | 46 | 23 | 8 | 1 | 2 | 13 | 32 | 59 | 94 | 137 | 188 | 247 |
| 217 | 162 | 115 | 76 | 45 | 22 | 7 | 0 | 3 | 14 | 33 | 60 | 95 | 138 | 189 | 248 |
| 216 | 161 | 114 | 75 | 44 | 21 | 6 | 5 | 4 | 15 | 34 | 61 | 96 | 139 | 190 | 249 |
| 215 | 160 | 113 | 74 | 43 | 20 | 19 | 18 | 17 | 16 | 35 | 62 | 97 | 140 | 191 | 250 |
| 214 | 159 | 112 | 73 | 42 | 41 | 40 | 39 | 38 | 37 | 36 | 63 | 98 | 141 | 192 | 251 |
| 213 | 158 | 111 | 72 | 71 | 70 | 69 | 68 | 67 | 66 | 65 | 64 | 99 | 142 | 193 | 252 |
| 212 | 157 | 110 | 109 | 108 | 107 | 106 | 105 | 104 | 103 | 102 | 101 | 100 | 143 | 194 | 253 |
| 211 | 156 | 155 | 154 | 153 | 152 | 151 | 150 | 149 | 148 | 147 | 146 | 145 | 144 | 195 | 254 |
| 210 | 209 | 208 | 207 | 206 | 205 | 204 | 203 | 202 | 201 | 200 | 199 | 198 | 197 | 196 | 255 |

FIG.18B

1803(FOR 180 DEGREES)

| 240 | 241 | 242 | 243 | 244 | 245 | 246 | 247 | 248 | 249 | 250 | 251 | 252 | 253 | 254 | 255 |
|---|---|---|---|---|---|---|---|---|---|---|---|---|---|---|---|
| 239 | 182 | 183 | 184 | 185 | 186 | 187 | 188 | 189 | 190 | 191 | 192 | 193 | 194 | 195 | 196 |
| 238 | 181 | 132 | 133 | 134 | 135 | 136 | 137 | 138 | 139 | 140 | 141 | 142 | 143 | 144 | 197 |
| 237 | 180 | 131 | 90 | 91 | 92 | 93 | 94 | 95 | 96 | 97 | 98 | 99 | 100 | 145 | 198 |
| 236 | 179 | 130 | 89 | 56 | 57 | 58 | 59 | 60 | 61 | 62 | 63 | 64 | 101 | 146 | 199 |
| 235 | 178 | 129 | 88 | 55 | 30 | 31 | 32 | 33 | 34 | 35 | 36 | 65 | 102 | 147 | 200 |
| 234 | 177 | 128 | 87 | 54 | 29 | 12 | 13 | 14 | 15 | 16 | 37 | 66 | 103 | 148 | 201 |
| 233 | 176 | 127 | 86 | 53 | 28 | 11 | 2 | 3 | 4 | 17 | 38 | 67 | 104 | 149 | 202 |
| 232 | 175 | 126 | 85 | 52 | 27 | 10 | 1 | 0 | 5 | 18 | 39 | 68 | 105 | 150 | 203 |
| 231 | 174 | 125 | 84 | 51 | 26 | 9 | 8 | 7 | 6 | 19 | 40 | 69 | 106 | 151 | 204 |
| 230 | 173 | 124 | 83 | 50 | 25 | 24 | 23 | 22 | 21 | 20 | 41 | 70 | 107 | 152 | 205 |
| 229 | 172 | 123 | 82 | 49 | 48 | 47 | 46 | 45 | 44 | 43 | 42 | 71 | 108 | 153 | 206 |
| 228 | 171 | 122 | 81 | 80 | 79 | 78 | 77 | 76 | 75 | 74 | 73 | 72 | 109 | 154 | 207 |
| 227 | 170 | 121 | 120 | 119 | 118 | 117 | 116 | 115 | 114 | 113 | 112 | 111 | 110 | 155 | 208 |
| 226 | 169 | 168 | 167 | 166 | 165 | 164 | 163 | 162 | 161 | 160 | 159 | 158 | 157 | 156 | 209 |
| 225 | 224 | 223 | 222 | 221 | 220 | 219 | 218 | 217 | 216 | 215 | 214 | 213 | 212 | 211 | 210 |

FIG.18C

1804(FOR 270 DEGREES)

| 255 | 196 | 197 | 198 | 199 | 200 | 201 | 202 | 203 | 204 | 205 | 206 | 207 | 208 | 209 | 210 |
|---|---|---|---|---|---|---|---|---|---|---|---|---|---|---|---|
| 254 | 195 | 144 | 145 | 146 | 147 | 148 | 149 | 150 | 151 | 152 | 153 | 154 | 155 | 156 | 211 |
| 253 | 194 | 143 | 100 | 101 | 102 | 103 | 104 | 105 | 106 | 107 | 108 | 109 | 110 | 157 | 212 |
| 252 | 193 | 142 | 99 | 64 | 65 | 66 | 67 | 68 | 69 | 70 | 71 | 72 | 111 | 158 | 213 |
| 251 | 192 | 141 | 98 | 63 | 36 | 37 | 38 | 39 | 40 | 41 | 42 | 73 | 112 | 159 | 214 |
| 250 | 191 | 140 | 97 | 62 | 35 | 16 | 17 | 18 | 19 | 20 | 43 | 74 | 113 | 160 | 215 |
| 249 | 190 | 139 | 96 | 61 | 34 | 15 | 4 | 5 | 6 | 21 | 44 | 75 | 114 | 161 | 216 |
| 248 | 189 | 138 | 95 | 60 | 33 | 14 | 3 | 0 | 7 | 22 | 45 | 76 | 115 | 162 | 217 |
| 247 | 188 | 137 | 94 | 59 | 32 | 13 | 2 | 1 | 8 | 23 | 46 | 77 | 116 | 163 | 218 |
| 246 | 187 | 136 | 93 | 58 | 31 | 12 | 11 | 10 | 9 | 24 | 47 | 78 | 117 | 164 | 219 |
| 245 | 186 | 135 | 92 | 57 | 30 | 29 | 28 | 27 | 26 | 25 | 48 | 79 | 118 | 165 | 220 |
| 244 | 185 | 134 | 91 | 56 | 55 | 54 | 53 | 52 | 51 | 50 | 49 | 80 | 119 | 166 | 221 |
| 243 | 184 | 133 | 90 | 89 | 88 | 87 | 86 | 85 | 84 | 83 | 82 | 81 | 120 | 167 | 222 |
| 242 | 183 | 132 | 131 | 130 | 129 | 128 | 127 | 126 | 125 | 124 | 123 | 122 | 121 | 168 | 223 |
| 241 | 182 | 181 | 180 | 179 | 178 | 177 | 176 | 175 | 174 | 173 | 172 | 171 | 170 | 169 | 224 |
| 240 | 239 | 238 | 237 | 236 | 235 | 234 | 233 | 232 | 231 | 230 | 229 | 228 | 227 | 226 | 225 |

FIG.18D

1901(FOR 0 DEGREE)

| 0 | 128 | 32 | 160 | 8 | 136 | 40 | 168 | 2 | 130 | 34 | 162 | 10 | 138 | 42 | 170 |
|---|---|---|---|---|---|---|---|---|---|---|---|---|---|---|---|
| 192 | 64 | 224 | 96 | 200 | 72 | 232 | 104 | 194 | 66 | 226 | 98 | 202 | 74 | 234 | 106 |
| 48 | 176 | 16 | 144 | 56 | 184 | 24 | 152 | 50 | 178 | 18 | 146 | 58 | 186 | 26 | 154 |
| 240 | 112 | 208 | 80 | 248 | 120 | 216 | 88 | 242 | 114 | 210 | 82 | 250 | 122 | 218 | 90 |
| 12 | 140 | 44 | 172 | 4 | 132 | 36 | 164 | 14 | 142 | 46 | 174 | 6 | 134 | 38 | 166 |
| 204 | 76 | 236 | 108 | 196 | 68 | 228 | 100 | 206 | 78 | 238 | 110 | 198 | 70 | 230 | 102 |
| 60 | 188 | 28 | 156 | 52 | 180 | 20 | 148 | 62 | 190 | 30 | 158 | 54 | 182 | 22 | 150 |
| 252 | 124 | 220 | 92 | 244 | 116 | 212 | 84 | 254 | 126 | 222 | 94 | 246 | 118 | 214 | 86 |
| 3 | 131 | 35 | 163 | 11 | 139 | 43 | 171 | 1 | 129 | 33 | 161 | 9 | 137 | 41 | 169 |
| 195 | 67 | 227 | 99 | 203 | 75 | 235 | 107 | 193 | 65 | 225 | 97 | 201 | 73 | 233 | 105 |
| 51 | 179 | 19 | 147 | 59 | 187 | 27 | 155 | 49 | 177 | 17 | 145 | 57 | 185 | 25 | 153 |
| 243 | 115 | 211 | 83 | 251 | 123 | 219 | 91 | 241 | 113 | 209 | 81 | 249 | 121 | 217 | 89 |
| 15 | 143 | 47 | 175 | 7 | 135 | 39 | 167 | 13 | 141 | 45 | 173 | 5 | 133 | 37 | 165 |
| 207 | 79 | 239 | 111 | 199 | 71 | 231 | 103 | 205 | 77 | 237 | 109 | 197 | 69 | 229 | 101 |
| 63 | 191 | 31 | 159 | 55 | 183 | 23 | 151 | 61 | 189 | 29 | 157 | 53 | 181 | 21 | 149 |
| 255 | 127 | 223 | 95 | 247 | 119 | 215 | 87 | 253 | 125 | 221 | 93 | 245 | 117 | 213 | 85 |

FIG.19A

1902 (FOR 90 DEGREES)

| 170 | 106 | 154 | 90 | 166 | 102 | 150 | 86 | 169 | 105 | 153 | 89 | 165 | 101 | 149 | 85 |
|---|---|---|---|---|---|---|---|---|---|---|---|---|---|---|---|
| 42 | 234 | 26 | 218 | 38 | 230 | 22 | 214 | 41 | 233 | 25 | 217 | 37 | 229 | 21 | 213 |
| 138 | 74 | 186 | 122 | 134 | 70 | 182 | 118 | 137 | 73 | 185 | 121 | 133 | 69 | 181 | 117 |
| 10 | 202 | 58 | 250 | 6 | 198 | 54 | 246 | 9 | 201 | 57 | 249 | 5 | 197 | 53 | 245 |
| 162 | 98 | 146 | 82 | 174 | 110 | 158 | 94 | 161 | 97 | 145 | 81 | 173 | 109 | 157 | 93 |
| 34 | 226 | 18 | 210 | 46 | 238 | 30 | 222 | 33 | 225 | 17 | 209 | 45 | 237 | 29 | 221 |
| 130 | 66 | 178 | 114 | 142 | 78 | 190 | 126 | 129 | 65 | 177 | 113 | 141 | 77 | 189 | 125 |
| 2 | 194 | 50 | 242 | 14 | 206 | 62 | 254 | 1 | 193 | 49 | 241 | 13 | 205 | 61 | 253 |
| 168 | 104 | 152 | 88 | 164 | 100 | 148 | 84 | 171 | 107 | 155 | 91 | 167 | 103 | 151 | 87 |
| 40 | 232 | 24 | 216 | 36 | 228 | 20 | 212 | 43 | 235 | 27 | 219 | 39 | 231 | 23 | 215 |
| 136 | 72 | 184 | 120 | 132 | 68 | 180 | 116 | 139 | 75 | 187 | 123 | 135 | 71 | 183 | 119 |
| 8 | 200 | 56 | 248 | 4 | 196 | 52 | 244 | 11 | 203 | 59 | 251 | 7 | 199 | 55 | 247 |
| 160 | 96 | 144 | 80 | 172 | 108 | 156 | 92 | 163 | 99 | 147 | 83 | 175 | 111 | 159 | 95 |
| 32 | 224 | 16 | 208 | 44 | 236 | 28 | 220 | 35 | 227 | 19 | 211 | 47 | 239 | 31 | 223 |
| 128 | 64 | 176 | 112 | 140 | 76 | 188 | 124 | 131 | 67 | 179 | 115 | 143 | 79 | 191 | 127 |
| 0 | 192 | 48 | 240 | 12 | 204 | 60 | 252 | 3 | 195 | 51 | 243 | 15 | 207 | 63 | 255 |

FIG.19B

1903(FOR 180 DEGREES)

| 85 | 213 | 117 | 245 | 93 | 221 | 125 | 253 | 87 | 215 | 119 | 247 | 95 | 223 | 127 | 255 |
|---|---|---|---|---|---|---|---|---|---|---|---|---|---|---|---|
| 149 | 21 | 181 | 53 | 157 | 29 | 189 | 61 | 151 | 23 | 183 | 55 | 159 | 31 | 191 | 63 |
| 101 | 229 | 69 | 197 | 109 | 237 | 77 | 205 | 103 | 231 | 71 | 199 | 111 | 239 | 79 | 207 |
| 165 | 37 | 133 | 5 | 173 | 45 | 141 | 13 | 167 | 39 | 135 | 7 | 175 | 47 | 143 | 15 |
| 89 | 217 | 121 | 249 | 81 | 209 | 113 | 241 | 91 | 219 | 123 | 251 | 83 | 211 | 115 | 243 |
| 153 | 25 | 185 | 57 | 145 | 17 | 177 | 49 | 155 | 27 | 187 | 59 | 147 | 19 | 179 | 51 |
| 105 | 233 | 73 | 201 | 97 | 225 | 65 | 193 | 107 | 235 | 75 | 203 | 99 | 227 | 67 | 195 |
| 169 | 41 | 137 | 9 | 161 | 33 | 129 | 1 | 171 | 43 | 139 | 11 | 163 | 35 | 131 | 3 |
| 86 | 214 | 118 | 246 | 94 | 222 | 126 | 254 | 84 | 212 | 116 | 244 | 92 | 220 | 124 | 252 |
| 150 | 22 | 182 | 54 | 158 | 30 | 190 | 62 | 148 | 20 | 180 | 52 | 156 | 28 | 188 | 60 |
| 102 | 230 | 70 | 198 | 110 | 238 | 78 | 206 | 100 | 228 | 68 | 196 | 108 | 236 | 76 | 204 |
| 166 | 38 | 134 | 6 | 174 | 46 | 142 | 14 | 164 | 36 | 132 | 4 | 172 | 44 | 140 | 12 |
| 90 | 218 | 122 | 250 | 82 | 210 | 114 | 242 | 88 | 216 | 120 | 248 | 80 | 208 | 112 | 240 |
| 154 | 26 | 186 | 58 | 146 | 18 | 178 | 50 | 152 | 24 | 184 | 56 | 144 | 16 | 176 | 48 |
| 106 | 234 | 74 | 202 | 98 | 226 | 66 | 194 | 104 | 232 | 72 | 200 | 96 | 224 | 64 | 192 |
| 170 | 42 | 138 | 10 | 162 | 34 | 130 | 2 | 168 | 40 | 136 | 8 | 160 | 32 | 128 | 0 |

FIG.19C 1904 (FOR 270 DEGREES)

| 255 | 63 | 207 | 15 | 243 | 51 | 195 | 3 | 252 | 60 | 204 | 12 | 240 | 48 | 192 | 0 |
|---|---|---|---|---|---|---|---|---|---|---|---|---|---|---|---|
| 127 | 191 | 79 | 143 | 115 | 179 | 67 | 131 | 124 | 188 | 76 | 140 | 112 | 176 | 64 | 128 |
| 223 | 31 | 239 | 47 | 211 | 19 | 227 | 35 | 220 | 28 | 236 | 44 | 208 | 16 | 224 | 32 |
| 95 | 159 | 111 | 175 | 83 | 147 | 99 | 163 | 92 | 156 | 108 | 172 | 80 | 144 | 96 | 160 |
| 247 | 55 | 199 | 7 | 251 | 59 | 203 | 11 | 244 | 52 | 196 | 4 | 248 | 56 | 200 | 8 |
| 119 | 183 | 71 | 135 | 123 | 187 | 75 | 139 | 116 | 180 | 68 | 132 | 120 | 184 | 72 | 136 |
| 215 | 23 | 231 | 39 | 219 | 27 | 235 | 43 | 212 | 20 | 228 | 36 | 216 | 24 | 232 | 40 |
| 87 | 151 | 103 | 167 | 91 | 155 | 107 | 171 | 84 | 148 | 100 | 164 | 88 | 152 | 104 | 168 |
| 253 | 61 | 205 | 13 | 241 | 49 | 193 | 1 | 254 | 62 | 206 | 14 | 242 | 50 | 194 | 2 |
| 125 | 189 | 77 | 141 | 113 | 177 | 65 | 129 | 126 | 190 | 78 | 142 | 114 | 178 | 66 | 130 |
| 221 | 29 | 237 | 45 | 209 | 17 | 225 | 33 | 222 | 30 | 238 | 46 | 210 | 18 | 226 | 34 |
| 93 | 157 | 109 | 173 | 81 | 145 | 97 | 161 | 94 | 158 | 110 | 174 | 82 | 146 | 98 | 162 |
| 245 | 53 | 197 | 5 | 249 | 57 | 201 | 9 | 246 | 54 | 198 | 6 | 250 | 58 | 202 | 10 |
| 117 | 181 | 69 | 133 | 121 | 185 | 73 | 137 | 118 | 182 | 70 | 134 | 122 | 186 | 74 | 138 |
| 213 | 21 | 229 | 37 | 217 | 25 | 233 | 41 | 214 | 22 | 230 | 38 | 218 | 26 | 234 | 42 |
| 85 | 149 | 101 | 165 | 89 | 153 | 105 | 169 | 86 | 150 | 102 | 166 | 90 | 154 | 106 | 170 |

FIG.19D 2001 (FOR 0 DEGREE)

| 210 | 211 | 212 | 213 | 214 | 215 | 216 | 217 | 218 | 219 | 220 | 221 | 222 | 223 | 224 | 225 |
|---|---|---|---|---|---|---|---|---|---|---|---|---|---|---|---|
| 209 | 156 | 157 | 158 | 159 | 160 | 161 | 162 | 163 | 164 | 165 | 166 | 167 | 168 | 169 | 226 |
| 208 | 155 | 110 | 111 | 112 | 113 | 114 | 115 | 116 | 117 | 118 | 119 | 120 | 121 | 170 | 227 |
| 207 | 154 | 109 | 72 | 73 | 74 | 75 | 76 | 77 | 78 | 79 | 80 | 81 | 122 | 171 | 228 |
| 206 | 153 | 108 | 71 | 42 | 43 | 44 | 45 | 46 | 47 | 48 | 49 | 82 | 123 | 172 | 229 |
| 205 | 152 | 107 | 70 | 41 | 20 | 21 | 22 | 23 | 24 | 25 | 50 | 83 | 124 | 173 | 230 |
| 204 | 151 | 106 | 69 | 40 | 19 | 6 | 7 | 8 | 9 | 26 | 51 | 84 | 125 | 174 | 231 |
| 203 | 150 | 105 | 68 | 39 | 18 | 5 | 0 | 1 | 10 | 27 | 52 | 85 | 126 | 175 | 232 |
| 202 | 149 | 104 | 67 | 38 | 17 | 4 | 3 | 2 | 11 | 28 | 53 | 86 | 127 | 176 | 233 |
| 201 | 148 | 103 | 66 | 37 | 16 | 15 | 14 | 13 | 12 | 29 | 54 | 87 | 128 | 177 | 234 |
| 200 | 147 | 102 | 65 | 36 | 35 | 34 | 33 | 32 | 31 | 30 | 55 | 88 | 129 | 178 | 235 |
| 199 | 146 | 101 | 64 | 63 | 62 | 61 | 60 | 59 | 58 | 57 | 56 | 89 | 130 | 179 | 236 |
| 198 | 145 | 100 | 99 | 98 | 97 | 96 | 95 | 94 | 93 | 92 | 91 | 90 | 131 | 180 | 237 |
| 197 | 144 | 143 | 142 | 141 | 140 | 139 | 138 | 137 | 136 | 135 | 134 | 133 | 132 | 181 | 238 |
| 196 | 195 | 194 | 193 | 192 | 191 | 190 | 189 | 188 | 187 | 186 | 185 | 184 | 183 | 182 | 239 |
| 255 | 254 | 253 | 252 | 251 | 250 | 249 | 248 | 247 | 246 | 245 | 244 | 243 | 242 | 241 | 240 |

FIG.20A

2002(FOR 90 DEGREES)

| 225 | 226 | 227 | 228 | 229 | 230 | 231 | 232 | 233 | 234 | 235 | 236 | 237 | 238 | 239 | 240 |
|---|---|---|---|---|---|---|---|---|---|---|---|---|---|---|---|
| 224 | 169 | 170 | 171 | 172 | 173 | 174 | 175 | 176 | 177 | 178 | 179 | 180 | 181 | 182 | 241 |
| 223 | 168 | 121 | 122 | 123 | 124 | 125 | 126 | 127 | 128 | 129 | 130 | 131 | 132 | 183 | 242 |
| 222 | 167 | 120 | 81 | 82 | 83 | 84 | 85 | 86 | 87 | 88 | 89 | 90 | 133 | 184 | 243 |
| 221 | 166 | 199 | 80 | 49 | 50 | 51 | 52 | 53 | 54 | 55 | 56 | 91 | 134 | 185 | 244 |
| 220 | 165 | 118 | 79 | 48 | 25 | 26 | 27 | 28 | 29 | 30 | 57 | 92 | 135 | 186 | 245 |
| 219 | 164 | 117 | 78 | 47 | 24 | 9 | 10 | 11 | 12 | 31 | 58 | 93 | 136 | 187 | 246 |
| 218 | 163 | 116 | 77 | 46 | 23 | 8 | 1 | 2 | 13 | 32 | 59 | 94 | 137 | 188 | 247 |
| 217 | 162 | 115 | 76 | 45 | 22 | 7 | 0 | 3 | 14 | 33 | 60 | 95 | 138 | 189 | 248 |
| 216 | 161 | 114 | 75 | 44 | 21 | 6 | 5 | 4 | 15 | 34 | 61 | 96 | 139 | 190 | 249 |
| 215 | 160 | 113 | 74 | 43 | 20 | 19 | 18 | 17 | 16 | 35 | 62 | 97 | 140 | 191 | 250 |
| 214 | 159 | 112 | 73 | 42 | 41 | 40 | 39 | 38 | 37 | 36 | 63 | 98 | 141 | 192 | 251 |
| 213 | 158 | 111 | 72 | 71 | 70 | 69 | 68 | 67 | 66 | 65 | 64 | 99 | 142 | 193 | 252 |
| 212 | 157 | 110 | 109 | 108 | 107 | 106 | 105 | 104 | 103 | 102 | 101 | 100 | 143 | 194 | 253 |
| 211 | 156 | 155 | 154 | 153 | 152 | 151 | 150 | 149 | 148 | 147 | 146 | 145 | 144 | 195 | 254 |
| 210 | 209 | 208 | 207 | 206 | 205 | 204 | 203 | 202 | 201 | 200 | 199 | 198 | 197 | 196 | 255 |

FIG.20B

2003 (FOR 180 DEGREES)

| 240 | 241 | 242 | 243 | 244 | 245 | 246 | 247 | 248 | 249 | 250 | 251 | 252 | 253 | 254 | 255 |
|---|---|---|---|---|---|---|---|---|---|---|---|---|---|---|---|
| 239 | 182 | 183 | 184 | 185 | 186 | 187 | 188 | 189 | 190 | 191 | 192 | 193 | 194 | 195 | 196 |
| 238 | 181 | 132 | 133 | 134 | 135 | 136 | 137 | 138 | 139 | 140 | 141 | 142 | 143 | 144 | 197 |
| 237 | 180 | 131 | 90 | 91 | 92 | 93 | 94 | 95 | 96 | 97 | 98 | 99 | 100 | 145 | 198 |
| 236 | 179 | 130 | 89 | 56 | 57 | 58 | 59 | 60 | 61 | 62 | 63 | 64 | 101 | 146 | 199 |
| 235 | 178 | 129 | 88 | 55 | 30 | 31 | 32 | 33 | 34 | 35 | 36 | 65 | 102 | 147 | 200 |
| 234 | 177 | 128 | 87 | 54 | 29 | 12 | 13 | 14 | 15 | 16 | 37 | 66 | 103 | 148 | 201 |
| 233 | 176 | 127 | 86 | 53 | 28 | 11 | 2 | 3 | 4 | 17 | 38 | 67 | 104 | 149 | 202 |
| 232 | 175 | 126 | 85 | 52 | 27 | 10 | 1 | 0 | 5 | 18 | 39 | 68 | 105 | 150 | 203 |
| 231 | 174 | 125 | 84 | 51 | 26 | 9 | 8 | 7 | 6 | 19 | 40 | 69 | 106 | 151 | 204 |
| 230 | 173 | 124 | 83 | 50 | 25 | 24 | 23 | 22 | 21 | 20 | 41 | 70 | 107 | 152 | 205 |
| 229 | 172 | 123 | 82 | 49 | 48 | 47 | 46 | 45 | 44 | 43 | 42 | 71 | 108 | 153 | 206 |
| 228 | 171 | 122 | 81 | 80 | 79 | 78 | 77 | 76 | 75 | 74 | 73 | 72 | 109 | 154 | 207 |
| 227 | 170 | 121 | 120 | 119 | 118 | 117 | 116 | 115 | 114 | 113 | 112 | 111 | 110 | 155 | 208 |
| 226 | 169 | 168 | 167 | 166 | 165 | 164 | 163 | 162 | 161 | 160 | 159 | 158 | 157 | 156 | 209 |
| 225 | 224 | 223 | 222 | 221 | 220 | 219 | 218 | 217 | 216 | 215 | 214 | 213 | 212 | 211 | 210 |

FIG.20C

2004 (FOR 270 DEGREES)

| 255 | 196 | 197 | 198 | 199 | 200 | 201 | 202 | 203 | 204 | 205 | 206 | 207 | 208 | 209 | 210 |
|---|---|---|---|---|---|---|---|---|---|---|---|---|---|---|---|
| 254 | 195 | 144 | 145 | 146 | 147 | 148 | 149 | 150 | 151 | 152 | 153 | 154 | 155 | 156 | 211 |
| 253 | 194 | 143 | 100 | 101 | 102 | 103 | 104 | 105 | 106 | 107 | 108 | 109 | 110 | 157 | 212 |
| 252 | 193 | 142 | 99 | 64 | 65 | 66 | 67 | 68 | 69 | 70 | 71 | 72 | 111 | 158 | 213 |
| 251 | 192 | 141 | 98 | 63 | 36 | 37 | 38 | 39 | 40 | 41 | 42 | 73 | 112 | 159 | 214 |
| 250 | 191 | 140 | 97 | 62 | 35 | 16 | 17 | 18 | 19 | 20 | 43 | 74 | 113 | 160 | 215 |
| 249 | 190 | 139 | 96 | 61 | 34 | 15 | 4 | 5 | 6 | 21 | 44 | 75 | 114 | 161 | 216 |
| 248 | 189 | 138 | 95 | 60 | 33 | 14 | 3 | 0 | 7 | 22 | 45 | 76 | 115 | 162 | 217 |
| 247 | 188 | 137 | 94 | 59 | 32 | 13 | 2 | 1 | 8 | 23 | 46 | 77 | 116 | 163 | 218 |
| 246 | 187 | 136 | 93 | 58 | 31 | 12 | 11 | 10 | 9 | 24 | 47 | 78 | 117 | 164 | 219 |
| 245 | 186 | 135 | 92 | 57 | 30 | 29 | 28 | 27 | 26 | 25 | 48 | 79 | 118 | 165 | 220 |
| 244 | 185 | 134 | 91 | 56 | 55 | 54 | 53 | 52 | 51 | 50 | 49 | 80 | 119 | 166 | 221 |
| 243 | 184 | 133 | 90 | 89 | 88 | 87 | 86 | 85 | 84 | 83 | 82 | 81 | 120 | 167 | 222 |
| 242 | 183 | 132 | 131 | 130 | 129 | 128 | 127 | 126 | 125 | 124 | 123 | 122 | 121 | 168 | 223 |
| 241 | 182 | 181 | 180 | 179 | 178 | 177 | 176 | 175 | 174 | 173 | 172 | 171 | 170 | 169 | 224 |
| 240 | 239 | 238 | 237 | 236 | 235 | 234 | 233 | 232 | 231 | 230 | 229 | 228 | 227 | 226 | 225 |

FIG.20D

IMAGE PROCESSING APPARATUS, AN IMAGE PROCESSING METHOD, AND A PROGRAM THEREOF FOR HANDLING A COPY-FORGERY-INHIBITED PATTERN IMAGE

BACKGROUND OF THE INVENTION

1. Field of the Invention

The present invention relates to an image processing apparatus, an image processing method, and a program thereof for handling a copy-forgery-inhibited pattern image.

2. Description of Related Art

Presently, there is special paper called forgery-proof paper. The forgery-proof paper has a character string such as "copy" embedded therein, which a person cannot see at a glance. On a copy obtained by making a copy of a forgery-proof paper, the embedded character string appears. Accordingly, an original document using such forgery-proof paper can be easily distinguished from a copy thereof. In addition, this makes it possible to discourage a person who is attempting forgery from using the copy of the document.

With such an effect, the forgery-proof paper has been used for preparing certificates of residence and forms. However, the forgery-proof paper has a problem of entailing higher cost than plain paper. In addition, it has a problem of causing only the character string embedded during the production of the forgery-proof paper to appear on a copy. In such circumstances, a new technique capable of achieving an effect similar to the forgery-proof paper has attracted attention recently (see Japanese Patent Laid-Open No. 2001-197297). It combines source document image data formed by using a computer with copy-forgery-inhibited pattern (sometimes referred to as "copy check pattern") image data, and outputs the image data obtained by the combination, including the copy-forgery-inhibited pattern, to plain paper.

Into the copy-forgery-inhibited pattern image data, a prescribed character string or the like is embedded. Thus, on a copy obtained by copying a document containing of the image data including the copy-forgery-inhibited pattern, the character string appears in the same manner as in the case of using the forgery-proof paper.

The technique uses plain paper. Accordingly, it has an advantage of being able to create an original cheaper than using the forgery-proof paper. In addition, the technique can generate new image data with a copy-forgery-inhibited pattern every time an original is created. Accordingly, the technique can freely set the copy-forgery-inhibited pattern color of the copy-forgery-inhibited pattern image data and can set a character string to be embedded into the copy-forgery-inhibited pattern.

Incidentally, the copy-forgery-inhibited pattern image data consists of a "surviving" region and a "disappearing" region (or a region that becomes thinner than the "surviving" region) on a copy. The density levels of the two regions are nearly equal on the original. Thus, it is difficult for human eyes to perceive that a character string such as "COPY" is embedded. Here, the term "surviving" means that the image in the original reappears precisely on the copy article. On the other hand, the term "disappearing" means that it is difficult for the image in the original to reappear on the copy.

From this point forward, the "surviving" region on the copy is referred to as a "latent image portion", and the "disappearing" region (or a region that becomes thinner than the "surviving" region) on the copy is referred to as a "background portion".

FIG. 14 is a diagram showing a state of dots in the copy-forgery-inhibited pattern image data. In FIG. 14, a dot assembled (i.e., clustered) region is a latent image portion, and a dot dispersed region is a background portion. The dots in the two regions are generated by different halftone dot processing or by different dithering processing. For example, the dots in the latent image portion are generated by halftone dot processing with a small Lines Per Inch (LPI), and the dots in the background portion are generated by halftone dot processing with a large Lines Per Inch (LPI). Alternatively, the dots in the latent image portion are generated using a dot concentrated-type dithering matrix, and the dots in the background portion are generated using a dot dispersed-type dithering matrix.

Incidentally, the reproducibility of a copying machine depends on the input resolution or output resolution of the copying machine. Accordingly, the reproducibility of the copying machine has a limit. Consider a case where the dots in the latent image portion of the copy-forgery-inhibited pattern image data are made greater than the dots reproducible by the copying machine and the dots in the background portion are made smaller than the dots reproducible by the copying machine. In such a case, although the dots in the latent image portion reappear on a copy in general, the dots in the background portion are difficult to make reappear. As a result, the latent image portion reappears denser than the background portion on the copy article. From now on, a state that an embedded character string emerges because the latent image portion reappears denser than the background portion on the copy article is referred to as visualizing.

FIGS. 15(a) and 15(b) are drawings showing the visualizing. These drawings schematically show that, although the assembled dots (larger dots) reappear on the copy, the dispersed dots (smaller dots) do not reappear precisely on the copy.

As for the copy-forgery-inhibited pattern image data, it is not limited to the foregoing configuration, but can have any configuration that renders visible (visualizes) character strings like "COPY", symbols and patterns in such a manner that a person can recognize them on the copy. In addition, even if a character string such as "COPY" is shown in white on the copy, it can be said that the copy-forgery-inhibited pattern image data achieves its object. In this case, it goes without saying that the region of "COPY" is referred to as a background portion.

The constituent elements of the copy-forgery-inhibited pattern are a background portion and a latent image portion, and it is important that the two types of regions are represented on the original at nearly the same density level. For example, Japanese Patent Laid-Open No. 2006-229316 describes a method of compensating for the dot reproducibility of an image forming apparatus due to long-term deterioration. More specifically, a technique is described which carries out calibration of the latent image portion and background portion of the copy-forgery-inhibited pattern using screens with various Lines Per Inch (LPI), and switches the screen between the background portion and latent image portion of the copy-forgery-inhibited pattern.

However, there is a problem unsolvable by switching the Lines Per Inch (LPI) of the screen. The problem is that the density level of the copy-forgery-inhibited pattern changes when outputting the image data including the copy-forgery-inhibited pattern (combined image data) to paper after rotating it.

In the image forming apparatus, according to a paper feed direction or a paper output direction, or according to user instructions, the image data including the copy-forgery-inhibited pattern (combined image data) is sometimes output after having been rotated. Naturally, the latent image pattern (dot pattern of the latent image portion) and background pattern (dot pattern of the background portion) combined in the image data with the copy-forgery-inhibited pattern are also rotated and output. In the course of this, the latent image pattern and the background pattern (the two patterns are together referred to as a "copy-forgery-inhibited pattern") are affected by characteristics of the image forming apparatus at the time of image forming, which differ from those when they are not rotated. As a result, the density levels when they are output to paper differ from each other.

For example, when the image forming apparatus is an electrophotography system, the difference in characteristics results from a fact that the potential state on the photoconductive drum varies depending on whether the rotation is made or not, because of differences in the transient response characteristics or in the spot diameter of the laser of the image forming apparatus, as will be described below.

FIG. 16 is a schematic view of that.

FIG. 16A shows that because of the transient response characteristics of the laser, the laser scanning is carried out in a different manner at the time when the digital image data consists of 1×2 pixels, or 2×1 pixels obtained by rotating it. The output of the laser cannot follow the digital data directly, but takes some time in response. For 1×2 pixels, the laser scanning of one pixel is carried out twice, whereas for 2×1 pixels, the laser scanning of two pixels is carried out once. Because of the transient response characteristics of the laser, the scanning of one pixel is not equal to half the scanning of two pixels. Thus, the potential state on the photoconductive drum changes, and even if they are digital dots of the same size, their density level on the output document differs from each other.

FIG. 16B shows that, because of the difference in the spot diameter of the laser, the laser scanning is carried out in a different manner for the 1×2 pixels of the digital image data and for the 2×1 pixels obtained by rotating it. The spot diameter of the laser differs in the main scanning direction and subscan direction, and has an elliptical shape as shown in FIG. 16B. Here, for the 1×2 pixels, the laser scanning for one pixel is carried out twice, and for 2×1, the laser scanning for two pixels is carried out once. Because of the difference in the spot diameter of the laser, the two pixels in the subscan direction and the two pixels in the main scanning direction are not irradiated with a laser spot of the same shape. Thus, the potential state on the photoconductive drum differs, and even if they are digital dots of the same size, their density level on the output document differs from each other.

As for causes for having different characteristics due to rotation, there are various causes other than that described above, such as a timing difference in turning on and off of the laser in the subscan direction. As a result, the problem of having a different density level between the latent image and the background of the copy-forgery-inhibited pattern image arises depending on whether the copy-forgery-inhibited pattern is output without rotation or output after rotation. This is because the dot patterns differ between the latent image portion and the background portion, and hence they are subjected to different effects.

As for the copy-forgery-inhibited pattern image, the density level of the latent image portion and the density level of the background portion should be equal when printed on a sheet. Accordingly, the copy-forgery-inhibited pattern image data is formed after undergoing density level adjustment (calibration) in such a manner that the respective density levels (the density level of the background portion and the density level of the latent image portion) have the same level when printed on a sheet.

However, as for the copy-forgery-inhibited pattern image data which is generated after the calibration performed, in such a manner that the latent image and the background have the same density level at a particular image rotation angle, if the image is further rotated and printed on a sheet, the density level of the latent image portion and the density level of the background portion have a level difference. This can sometimes damage the function of the copy-forgery-inhibited pattern.

SUMMARY OF THE INVENTION

Therefore, an object of the present invention is to solve the foregoing problem. To solve the foregoing problem, the present invention is configured as follows concretely.

In the first aspect of the present invention, there is provided an image processing apparatus comprising: generating unit for generating copy-forgery-inhibited pattern image data; and rotation unit for rotating the generated copy-forgery-inhibited pattern image data, wherein said generating unit generates the copy-forgery-inhibited pattern image data to be rotated by said rotation unit in accordance with a rotation angle in said rotation unit.

In the second aspect of the present invention, there is provided an image processing method comprising: a generating step of generating copy-forgery-inhibited pattern image data; and a rotation step of rotating the generated copy-forgery-inhibited pattern image data, wherein the generating step generates the copy-forgery-inhibited pattern image data to be rotated at the rotation step in accordance with a rotation angle at the rotation step.

In the third aspect of the present invention, there is provided a computer readable program on a computer readable medium for causing a computer to execute: a generating step of generating copy-forgery-inhibited pattern image data; and a rotation step of rotating the generated copy-forgery-inhibited pattern image data, wherein the generating step generates the copy-forgery-inhibited pattern image data to be rotated at the rotation step in accordance with a rotation angle at the rotation step.

As for the individual steps in the foregoing image processing method, they can be configured as a program to be executed by a computer in a variety of image processing apparatuses or information processing apparatuses. Then, causing the computer to read the program enables the computer to carry out the image processing method. In addition, it is also possible to cause the computer to read the program via a computer readable storage medium that stores the program.

Incidentally, in the present specification, the term "image processing apparatus" includes not only a dedicated image processing apparatus or image forming apparatus, but also a general-purpose information processing apparatus capable of executing the processing in accordance with the present invention.

According to the present invention, the dot pattern included in the copy-forgery-inhibited pattern image actually printed is settled regardless of the image rotation. This makes it possible to prevent the copy-forgery-inhibited pattern density level from fluctuating on an output article owing to the direction of the copy-forgery-inhibited pattern image, and hence to output the copy-forgery-inhibited pattern capable of achieving the functions of the copy-forgery-inhibited pattern.

Further features of the present invention will become apparent from the following description of exemplary embodiments (with reference to the attached drawings).

BRIEF DESCRIPTION OF THE DRAWINGS

FIG. 15 is a diagram showing visualizing;

FIG. 16A and FIG. 16B are schematic diagrams for explaining reasons for the density level differences in the copy-forgery-inhibited pattern image depending on the direction;

FIG. 17A to FIG. 17D are each a diagram showing an example of a 16×16 background matrix;

FIG. 18A to FIG. 18D are each a diagram showing an example of a 16×16 latent image matrix;

FIG. 19A to FIG. 19D are each a diagram showing an example of a background pattern;

FIG. 20A to FIG. 20D are each a diagram showing an example of a latent image pattern;

DESCRIPTION OF THE EMBODIMENTS

The best mode for implementing the present invention will now be described with reference to the accompanying drawings.

Incidentally, it is assumed in the following embodiments that a latent image character string or a latent image symbol is set in a latent image portion of a copy-forgery-inhibited pattern image, and an original (original printed matter) is output after combining the copy-forgery-inhibited pattern image with any given content image. In addition, the following description will be made in the assumption that the latent image character string or latent image symbol appears on the copy article because the background portion becomes thin with respect to the latent image portion. However, the copy-forgery-inhibited pattern image in the present invention is not limited to it. For example, it is also possible as described above to set the latent image character string or latent image symbol as the background portion and to set a region surrounding the background portion as the latent image portion, thereby expressing the latent image character string or latent image symbol in white in the copy article.

In addition, the present invention is applicable to any copy-forgery-inhibited patterns that change their patterns due to image rotation. In other words, the present invention is applicable to any copy-forgery-inhibited patterns in which the patterns of the latent image portion and background portion of the original are not symmetric with respect to a point. For example, it is also applicable to such a copy-forgery-inhibited pattern that causes different moiré to occur in the latent image portion and background portion on the copy article by disposing different dot patterns in them, thereby bringing about the density level difference. Besides, it is applicable to various conceivable methods such as forming the copy-forgery-inhibited pattern image using lines rather than dots.

First Embodiment

<Printing System>

Figure 1:
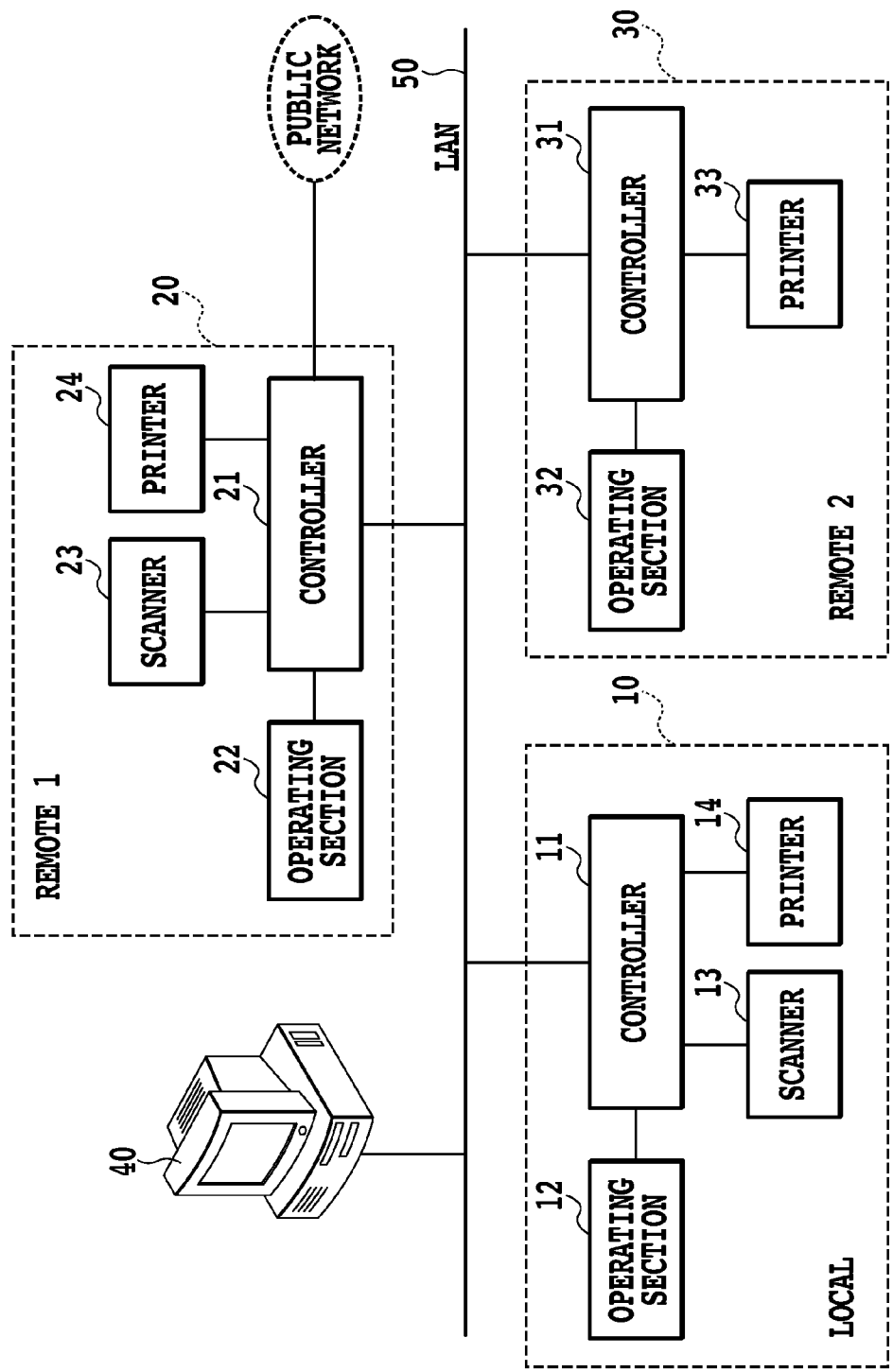
FIG. 1 is a block diagram showing an overall configuration of a printing system of an embodiment in accordance with the present invention.

FIG. 1 is a block diagram showing a configuration of a printing system of an embodiment in accordance with the present invention.

In this system, a host computer 40 and three image forming apparatuses (10, 20 and 30) are connected to a LAN 50. In the printing system in accordance with the present invention, however, they are not limited to these numbers connected. In addition, although a LAN is used as a connecting method between the apparatuses in the present embodiment, this is not essential. For example, it is also possible to use any networks such as a WAN (public network), any serial transmission systems such as USB, and any parallel transmission systems such as a Centronics interface and SCSI.

The host computer (called "PC" from now on) 40 has functions of a so-called personal computer. The PC 40 can transmit and receive files, and can transmit and receive e-mails via the LAN 50 or WAN using FTP or SMB protocol. In addition, the PC 40 can issue a print instruction to the image forming apparatus 10, 20 or 30 via a printer driver.

The image forming apparatuses 10 and 20 are devices having the same configuration. The image forming apparatus 30 is an image forming apparatus having only printing functions without a scanner section which the image forming apparatus 10 or 20 possesses. In the following description, paying attention to only the image forming apparatus 10 of the image forming apparatuses 10 and 20, its configuration will be described in detail for the sake of simplicity.

<Image Forming Apparatus 10>

The image forming apparatus 10 comprises a scanner section 13 of an image input device, a printer section 14 of the image output device, a controller (Controller Unit) 11 for controlling the operation of the image forming apparatus 10 in its entirety, and an operating section 12 serving as a user interface (UI).

Figure 2:
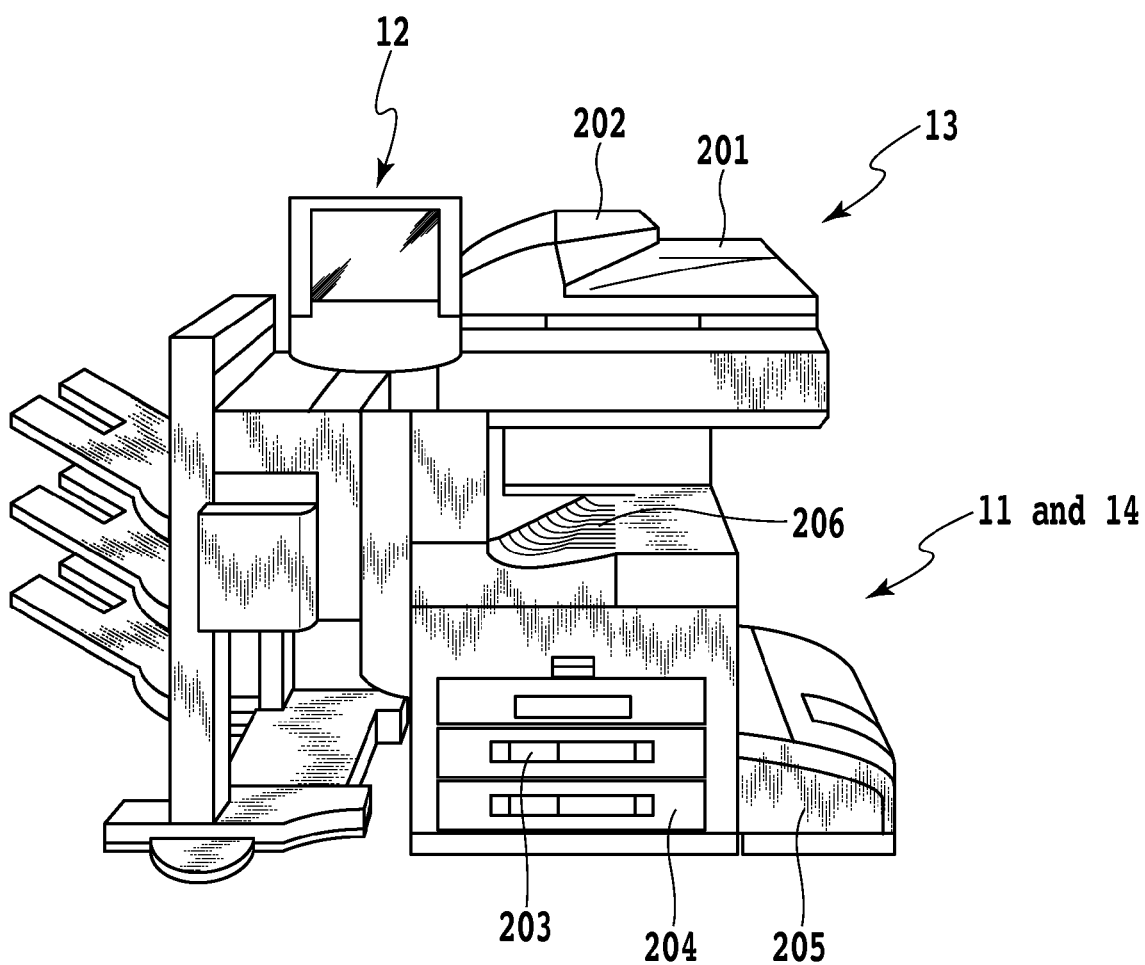
FIG. 2 is an exterior view of the image forming apparatus of the embodiment.

FIG. 2 shows an external appearance of the image forming apparatus 10.

The scanner section 13 converts image information to an electric signal by inputting to CCDs the reflected light obtained by exposing and scanning the image on a source document. In addition, the scanner section 13 further converts the electric signal to luminance signals consisting of individual colors R, G and B, and outputs the luminance signals to the controller 11 as image data.

Incidentally, the source document is placed on a tray 202 of a source document feeder 201. When a user instructs from the operating section 12 to start reading, the controller 11 provides the scanner section 13 with a source document read instruction. Receiving the instruction, the scanner section 13 feeds the source document one by one from the tray 202 of the source document feeder 201 to read the source document. As to the reading method of the source document, the automatic feeding by the source document feeder 201 is not essential. For example, a method is also possible which places the source document on a surface of a platen glass not shown and moves an exposure portion to carry out scanning of the source document.

The printer section 14 is an image forming device for forming image data received from the controller 11 on printing paper. The printer section 14 includes a plurality of paper cassettes 203, 204, and 205, which enable selection of a different paper size or different paper direction. The paper cassettes includes, for example, A4 (vertically oriented paper) and A4R (horizontally oriented paper) sheets so that a user can select by inputting designation. A paper output tray 206 receives printing paper after printing.

<Controller 11>

Next, the configuration of the controller 11 of the image forming apparatus 10 will be described in detail with reference to FIG. 3.

Figure 3:
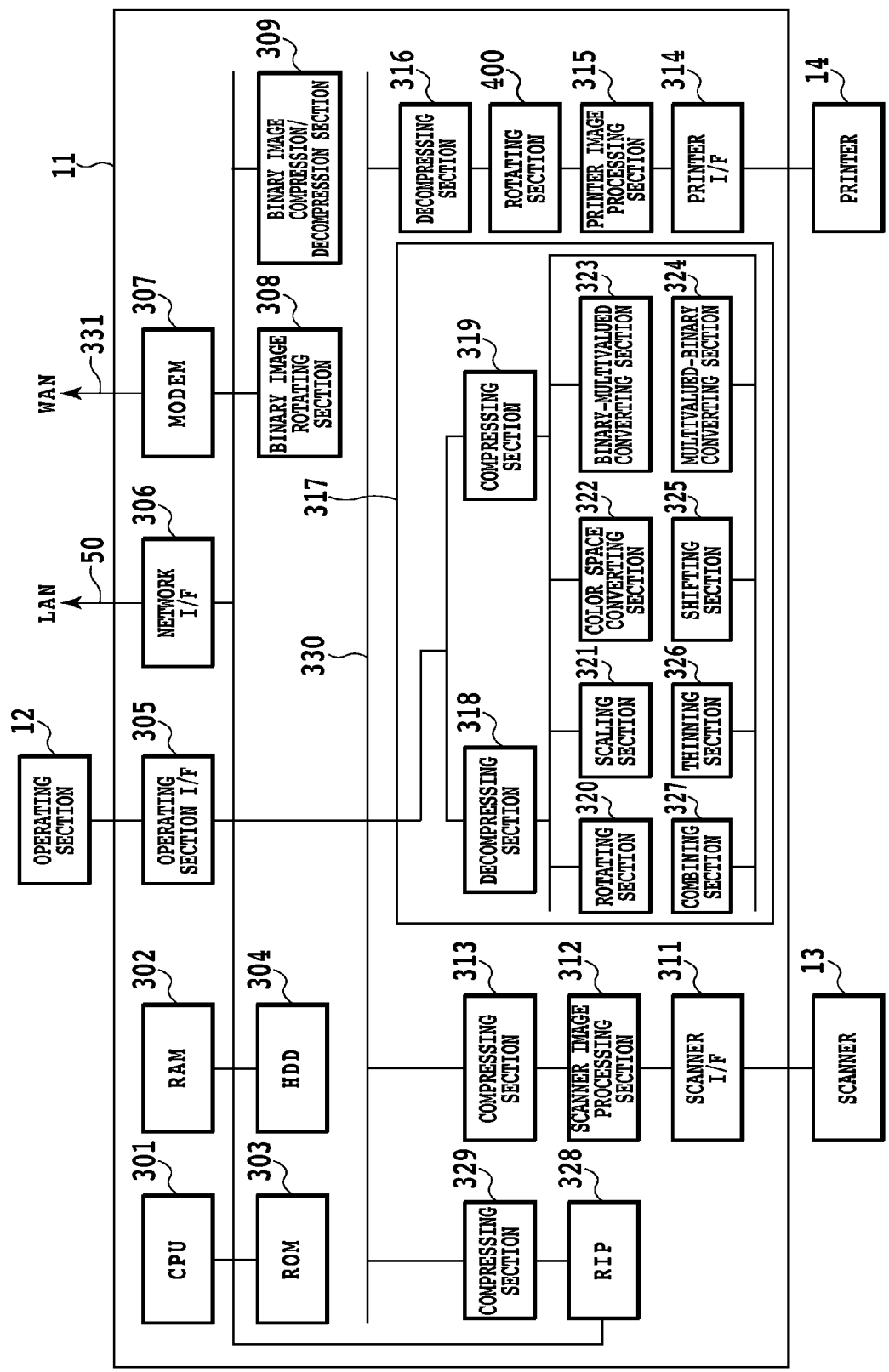
FIG. 3 is a block diagram of a controller of the image forming apparatus.

FIG. 3 is a block diagram of the controller 11 of the image forming apparatus 10.

The controller 11 is electrically connected to the scanner section 13 and printer section 14 on one hand, and to the PC 40 or external apparatus via the LAN 50 or WAN 331 on the other hand. This enables the input and output of the image data and device information.

A CPU 301 achieves centralized control of accesses to individual devices connected thereto according to control programs and the like stored in a ROM 303, and centralized control of various processings carried out inside the controller 11. A RAM 302 is a system work memory for the CPU 301 to operate, and a memory for temporarily storing image data. The RAM 302 consists of an involatile SRAM that retains the stored contents after the power off and a DRAM whose contents are erased after the power off. The ROM 303 stores a boot program and the like of the apparatus. An HDD 304 is a hard disk drive capable of storing system software and image data.

An operating section I/F 305 is an interface for connecting a system bus 310 and the operating section 12. The operating section I/F 305 receives the image data to be displayed on the operating section 12 from the system bus 310 and outputs it to the operating section 12, and supplies the information input from the operating section 12 to the system bus 310.

A network I/F 306 is connected between the LAN 50 and the system bus 310, and performs input and output of information. A modem 307 is connected between the WAN 331 and the system bus 310, and performs input and output of information. A binary image rotating section 308 converts (rotates) the direction of the image data before transmission. A binary image compression/decompression section 309 converts the resolution of the image data before transmission to a prescribed resolution or to a resolution matching the capacity of a party. The compression and decompression are carried out using a JBIG, MMR, MR or MH system. An image bus 330 is a transmission line for exchanging the image data, and consists of a PCI bus or IEEE 1394.

A scanner image processing section 312 carries out correction, processing and editing of the image data received from the scanner section 13 via a scanner I/F 311. Besides, the scanner image processing section 312 makes a decision on whether the received image data is a color source document or a black-and-white source document, or a text source document or a photographic source document. Then, it attaches the decision result to the image data. Such collateral information is referred to as image region data. Details of the processing the scanner image processing section 312 performs will be described later.

Figure 4:
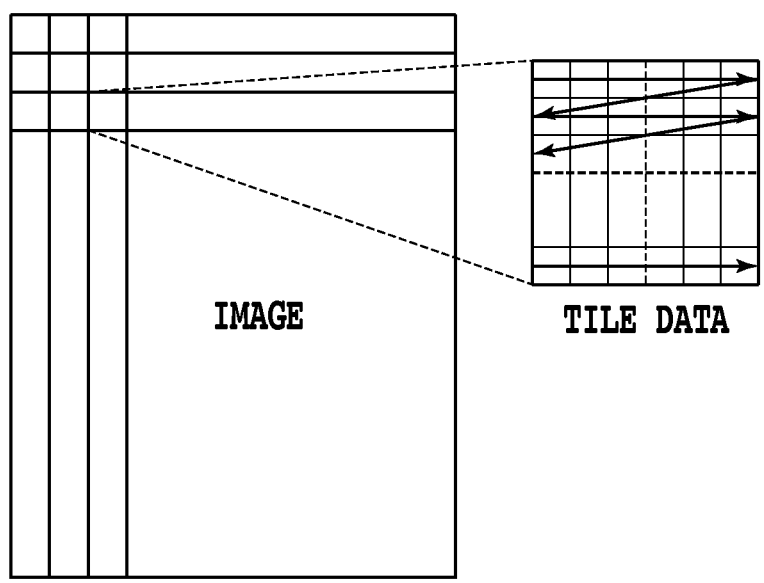
FIG. 4 is a schematic diagram showing tile data.

A compressing section 313 receives the image data, and divides the image data to blocks each consisting of 32 pixels× 32 pixels. Each 32×32 pixel image data is referred to as tile data. FIG. 4 schematically illustrates the tile data. On the source document (paper medium before read), each region corresponding to the tile data is referred to as a tile image. To the tile data, average luminance information in the 32×32 pixel block and the coordinate position of the tile image on the source document are added as header information. In addition, the compressing section 313 compresses the image data consisting of a plurality of tile data.

A decompressing section 316 decompresses the image data consisting of the tile data, and delivers it to a rotating section 400. The rotating section 400 rotates the combined image data in accordance with the paper direction if necessary. Then, after developing into a raster, it delivers it to a printer image processing section 315. Although an image converting section 317 includes an image rotating module, the image conversion is frequently used processing, and utilizing the image converting section 317 can delay the processing of the image data, thereby bringing about performance deterioration. Thus, the image is rotated by utilizing the rotating section 400 in general. The rotating processing of the tile data can be carried out by changing the order of delivering the tiles to the decompressing section, and by rotating each of the decompressed tiles.

The printer image processing section 315 receives the image data delivered from the rotating section 400, and performs image processing on the image data with referring to the image region data annexed to the image data. The image processed image data is supplied to the printer section 14 via a printer I/F 314. Details of the processing carried out by the printer image processing section 315 will be described later.

The image converting section 317 performs prescribed converting processing on the image data. The processing section comprises the following processing sections.

A decompressing section 318 decompresses the received image data. A compressing section 319 compresses the received image data. A rotating section 320 rotates the received image data. A scaling section 321 performs resolution converting processing of the received image data (such as from 600 dpi to 200 dpi). A color space converting section 322 converts the color space of the received image data. The color space converting section 322 can carry out a well-known background removal processing using a matrix or table, a well-known LOG converting processing (RGB→CMY), or a well-known output color correcting processing (CMY→CMYK) using a matrix ortable. A binary-multivalued converting section 323 converts received binary gradation image data to 256-step gradation image data. In contrast, a multivalued-binary converting section 324 converts received 256-step gradation image data to binary gradation image data by a technique such as error diffusion processing or the like.

A combining section 327 combines two received image data to generate a piece of image data. To combine two image data, such a method is applied that uses the average value of the luminance values of the corresponding pixels to be combined as a composite luminance value, or that uses the luminance values of the pixels with higher luminance levels as the luminance values of the pixels after the composition. In addition, a method of using darker pixels as the pixels after the composition is also possible. Furthermore, a method that determines the luminance value after the composition according to OR, AND or XOR operation and the like between the pixels to be combined is also applicable. These combining methods are all well-known techniques.

A thinning section 326 carries out resolution conversion by thinning out the pixels of the received image data, and generates image data with a resolution of ½, ¼, ⅛ and the like. A shifting section 325 gives a margin to or eliminates a margin from the received image data.

A RIP 328 receives intermediate data generated from PDL code data transmitted from the PC 40 or the like, and generates (multivalued) bit map data. A compressing section 329 compresses the bit map data the RIP 328 generates to the tile data.

<Scanner Image Processing Section 312>

Next, details of the internal configuration of the scanner image processing section 312 will be described with reference to FIG. 5.

Figure 5:
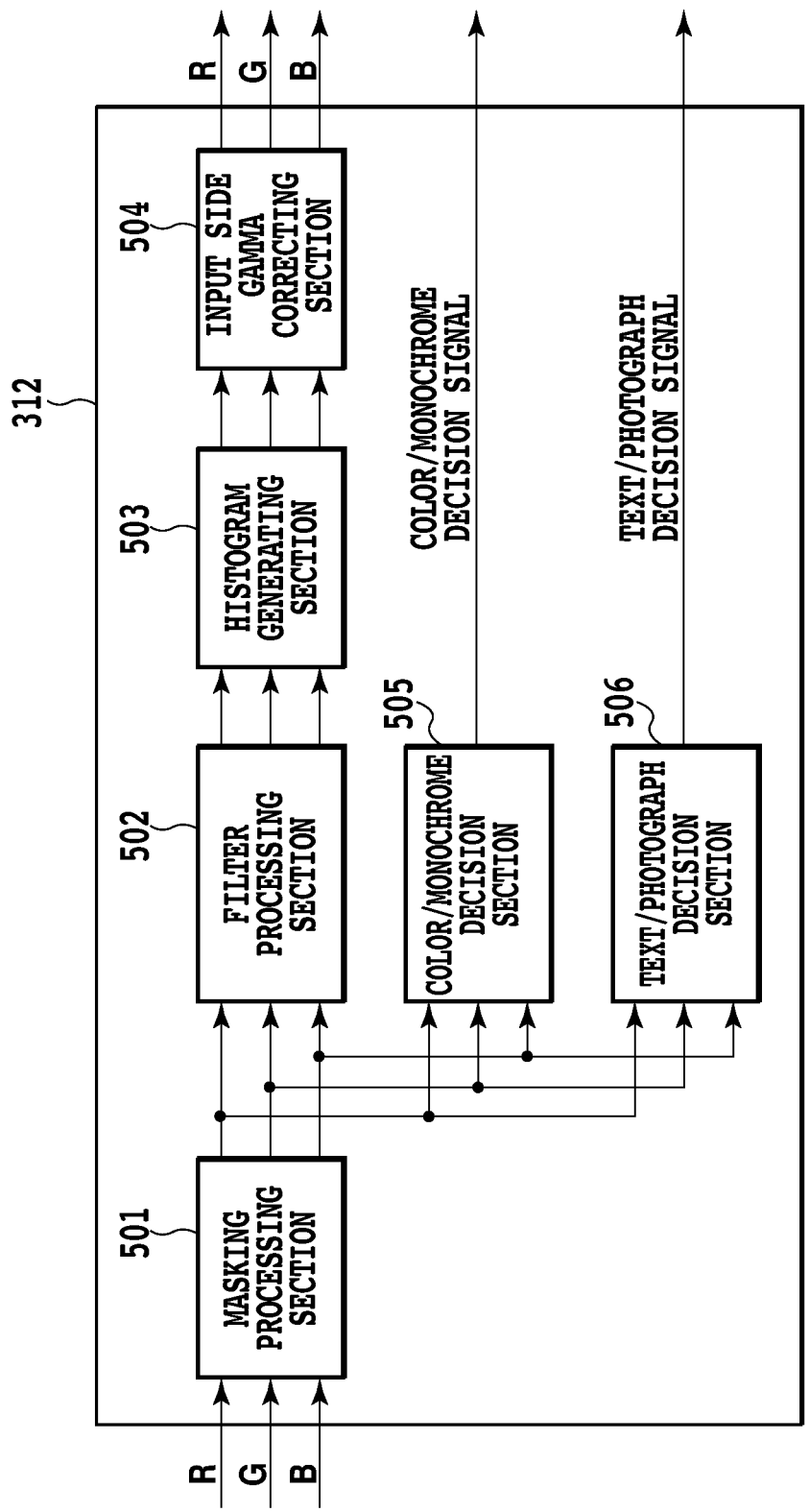
FIG. 5 is a block diagram of the scanner image processing section of the image forming apparatus.

FIG. 5 is a block diagram showing an internal configuration of the scanner image processing section 312.

The scanner image processing section 312 receives the image data composed of RGB luminance signals each consisting of eight bits. The luminance signals are converted to standard luminance signals independent of the filter colors of the CCDs by a masking processing section 501.

A filter processing section 502 freely corrects the spatial frequency of the received image data. The filter processing section 502 performs calculation processing on the received image data using a prescribed 7×7 calculation matrix, for example.

Incidentally, it is possible in a copying machine or multi-function machine to select a text mode, a photographic mode or a text/photographic mode as a copy mode. When the user selects the text mode, the filter processing section 502 applies a filter for text to the entire image data. When the user selects the photographic mode, it applies a filter for photographs to the entire image data. When the user selects the text/photographic mode, it adaptively switches a filter for each pixel in accordance with a text/photograph decision signal (part of the image region data) which will be described later. Thus, a decision is made for each pixel on whether to apply the filter for photographs or the filter for text. As for the filter for photographs, such coefficients that enable smoothing of only high frequency components are set to prevent image roughness. On the other hand, as for the filter for text, such coefficients that enable considerable edge emphasis are set to sharpen the characters.

A histogram generating section 503 samples the luminance data of the individual pixels constituting the received image data. More specifically, it samples the luminance data in a rectangular region enclosed from a start point to an end point designated in the main scanning direction and subscan direction at a fixed pitch in the main scanning direction and subscan direction. Then, it generates the histogram data from the sampled results. The generated histogram data are used to estimate the background level when carrying out the background removal processing. An input side gamma correcting section 504 converts to luminance data having nonlinear characteristics by using a prescribed converting table or the like.

A color/monochrome decision section 505 decides on whether the individual pixels constituting the received image data are a chromatic color or an achromatic color, and annexes the decision results to the image data as a color/monochrome decision signal (part of the image region data). A text/photograph decision section 506 makes a decision on whether each pixel constituting the image data is a pixel constituting text or a pixel constituting other than text (such as a photograph). Then, the decision results are annexed to the image data as a text/photograph decision signal (part of the image region data).

<Printer Image Processing Section 315>

Next, details of the processing in the printer image processing section 315 will be described with reference to FIG. 6.

Figure 6:
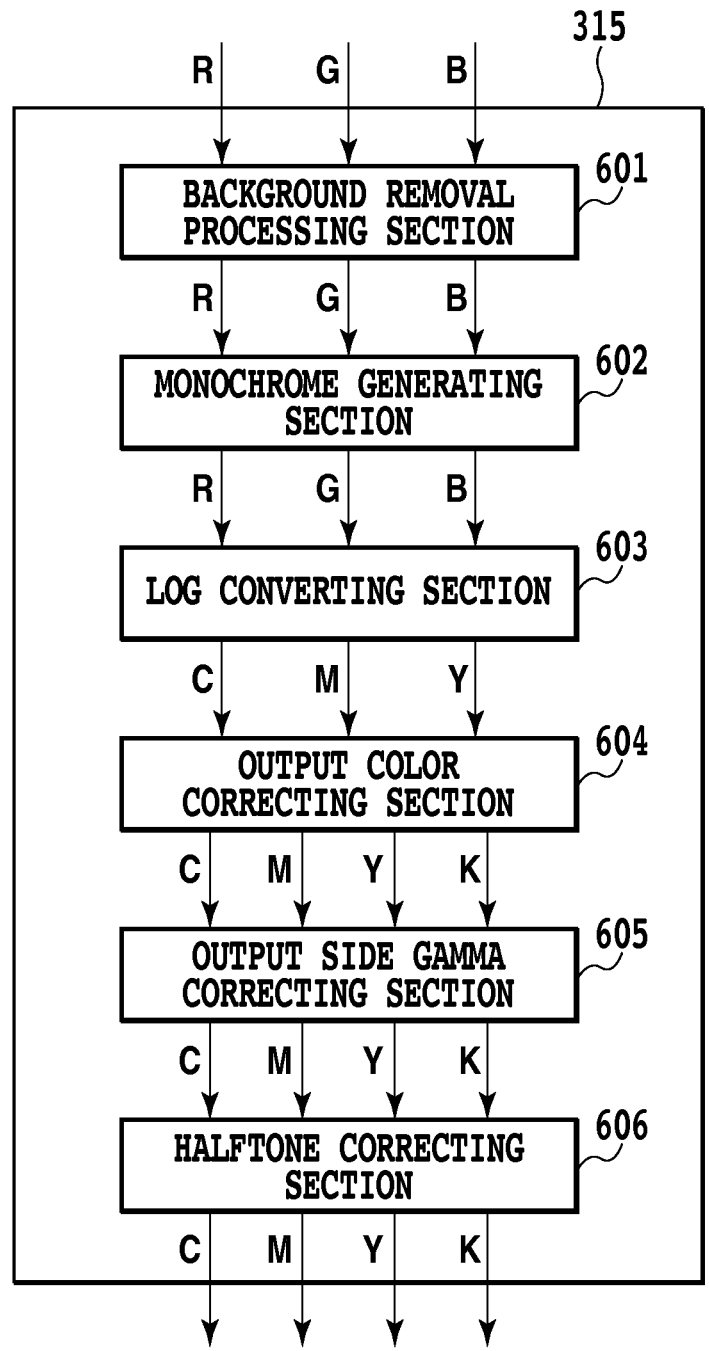
FIG. 6 is a block diagram of the printer image processing section of the image forming apparatus.

FIG. 6 is a diagram showing a flow of the processing carried out by the printer image processing section 315.

A background removal processing section 601 carries out the so-called background removal processing that removes the background color of the image data by using the histogram generated by the scanner image processing section 312. A monochrome generating section 602 converts the color data to the monochrome data when necessary. A Log converting section 603 carries out luminance level conversion. The Log converting section 603 converts the input RGB image data to CMY image data, for example.

An output color correcting section 604 carries out output color correction. For example, it converts the input CMY image data to CMYK image data by using a prescribed converting table or matrix. An output side gamma correcting section 605 carries out correction in such a manner that the density level after the output is proportional to the signal value input to the output side gamma correcting section 605. A halftone correcting section 606 performs optional halftone processing in accordance with the number of gray levels of the output printer section. For example, the halftone correcting section 606 binarizes or digitizes to 32 levels the received high gradient image data.

Incidentally, the individual processing sections in the scanner image processing section 312 or in the printer image processing section 315 can output the received image data without adding any individual processings. Passing data through without adding any processing thereto in a certain processing section is also expressed as "passing through the processing section".

The above is the detailed description of the controller 11.

All the foregoing operations are carried out by the CPU 301, which interprets and executes the programs loaded on the RAM to control the controller 11. The controlled state by the programs changes depending on the inputs to the operating section 12, LAN 50 and WAN 331 and on the conditions of the scanner 13 and printer 14.

<Copying Operation and PDL Printing Operation>

Next, details of the copying operation and PDL printing operation will be described with reference to FIG. 2, FIG. 3, FIG. 5 and FIG. 6.

First, the copying operation will be described.

A source document read by the scanner section 13 is delivered to the scanner image processing section 312 via the scanner I/F 311 as the image data. The scanner image processing section 312 performs on the image data the processing shown in FIG. 5 described above, and generates new image data subjected to the processing along with the image region data. Then, it annexes the image region data to the image data. Subsequently, the compressing section 313 divides the new image data into blocks each consisting of 32 pixels×32 pixels, thereby generating the tile data. In addition, the compressing section 313 compresses the image data consisting of a plurality of tile data. The image data compressed by the compressing section 313 is delivered to the RAM 302 to be stored.

Incidentally, the image data is delivered to the image converting section 317 as needed to undergo the image processing and is delivered to the RAM 302 again to be stored. After that, the image data stored in the RAM 302 is delivered to the decompressing section 316. In the course of this, when the rotating section 400 carries out the image rotation, the tiles are rearranged before delivery in such a manner that the order of delivering the tile data agrees with the order after the rotation.

The decompressing section 316 decompresses the image data. The decompressed raster image data is delivered to the rotating section 400. The rotating section 400 rotates the decompressed tile data. In addition, the rotating section 400 develops the image data consisting of the plurality of tile data after the decompression into a raster image. The image data developed into the raster image is delivered to the printer image processing section 315. The printer image processing section 315 carries out image data editing in accordance with the image region data annexed to the image data. The processing is the processing shown in FIG. 6 described before. The image data subjected to the editing by the printer image processing section 315 is delivered to the printer section 14 via the printer I/F 314. Finally, the printer section 14 carries out image forming on output paper.

Incidentally, the editing method in the individual processing sections in the scanner image processing section 312 and the printer image processing section 315, that is, in the individual processing sections shown in FIG. 5 and FIG. 6, can be switched by switching a register. The register switching is conducted in accordance with the image region data or (user) set information via the operating section 12. In addition, although not mentioned in the foregoing description, it goes without saying that it is also possible to execute any other various processings based on programs stored in the ROM 303 or HDD 304 and to retrieve optional image data stored in the ROM 303 or HDD 304.

Next, the PDL operation will be described.

The PDL data transmitted from the PC 40 via the LAN 50 is delivered to the RAM 302 via the network I/F 306 to be stored. The CPU 301 interprets the PDL data stored in the RAM 302 to generate the intermediate data, and delivers it to the RIP 328. The RIP 328 renders the intermediate data to generate raster style image data. The generated raster style image data is delivered to the compressing section 329.

The compressing section 329 compresses the image data after dividing it into blocks. The image data after the compression is delivered to the RAM 302. To the image data, the image region data is annexed which corresponds to object data (data indicating whether the image data is text image or photographic image and the like) contained in the PDL data. In addition, when necessary, the image data is delivered to the image converting section 317 to undergo the foregoing image processing, and then delivered to the RAM 302 again to be stored. When a PDL print instruction is present, the image data is delivered to the printer section 14 so that the image is formed on the output paper. Since this operation is the same as the foregoing copying operation, the description thereof is omitted here.

Next, a method of setting the copy-forgery-inhibited pattern will be described.

<Operating Screen>

Here, the operating screen of the image forming apparatus 10 will be described.

FIG. 7, FIG. 8, FIG. 9 and FIG. 10 show its initial screen and operating screens displayed when setting the copy-forgery-inhibited pattern.

Figure 7:
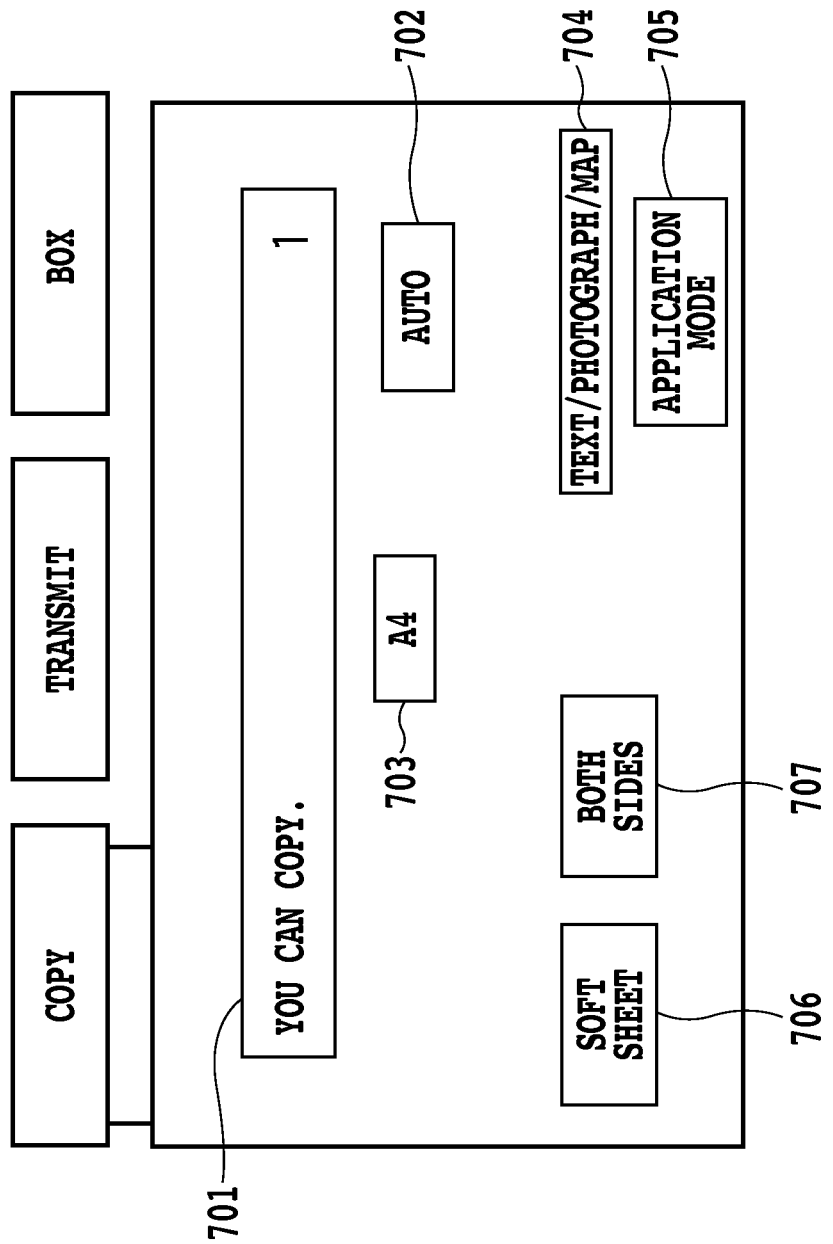
FIG. 7 is a diagram illustrating an initial screen on the operating section of the image forming apparatus.

First, FIG. 7 shows the initial screen in the image forming apparatus 10. A region 701 is an area for indicating whether the image forming apparatus 10 can accept copy or not, and the number of copies set (one in FIG. 7). A source document selection tab 704 is a tab for selecting the type of the source document. Every time the tab is pressed down, a selecting menu for selecting one of the three types of the text, photographic and text/photographic modes is displayed in a pop-up manner. A finishing tab 706 is a tab for carrying out settings associated with various types of finishing.

A duplex setting tab 707 is a tab for carrying out settings associated with duplex reading and duplex printing. A reading mode tab 702 is a tab for selecting a reading mode of the source document. Every time the tab is pressed down, a selecting menu for selecting one of the three types: color, black and auto (ACS) is displayed in a pop-up manner. When the color is selected, color copying is performed, and when the black is selected, monochrome copying is carried out. In addition, when the ACS is selected, the copy mode is decided according to the monochrome/color decision signal described above.

A paper selection tab 703 is a tab for selecting paper to be used. Every time the tab is pressed down, a selecting menu for selecting the paper set in the paper cassettes 203, 204 and 205 and the automatic paper selection is displayed in a pop-up manner. When the paper cassettes hold A4, A4R and A3, respectively, a selecting menu for selecting one of four types: automatic paper selection, A4, A4R and A3 are displayed in a pop-up manner. When the automatic paper selection is selected, suitable paper is selected in accordance with the size of the image scanned. In the other cases, the selected paper is used.

Figure 8:
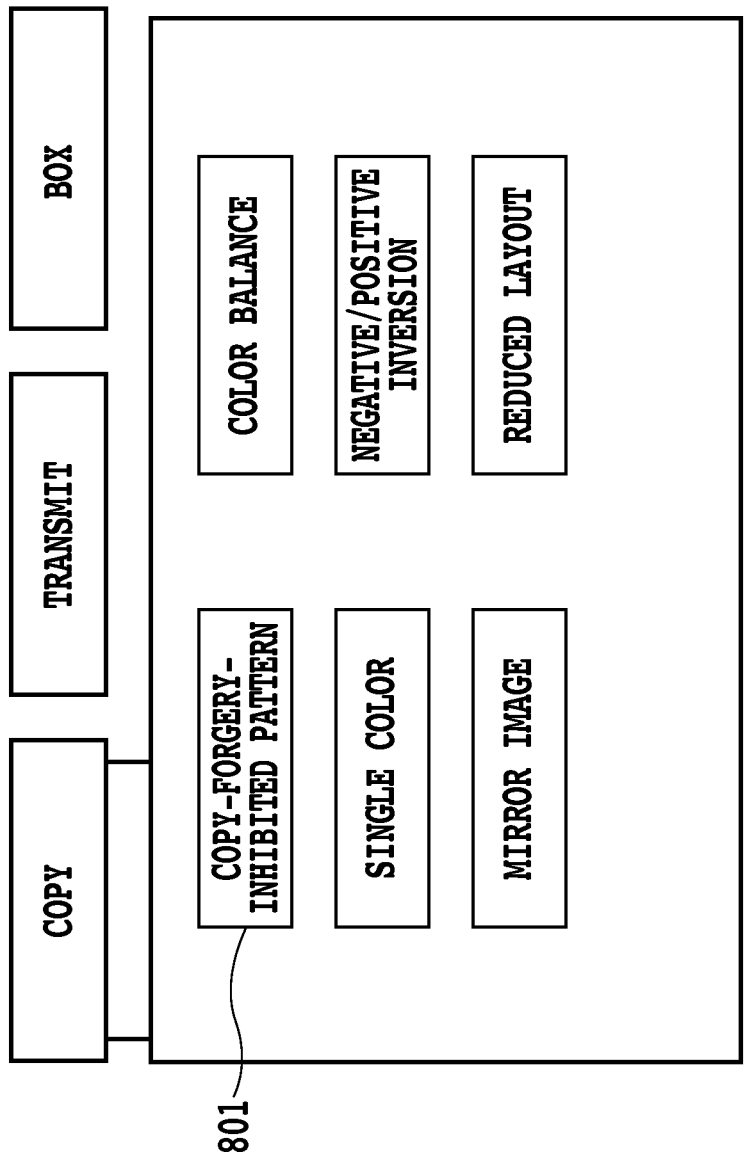
FIG. 8 is a diagram illustrating a setting screen (Part 1) of the copy-forgery-inhibited pattern on the operating section of the image forming apparatus.

FIG. 8 shows a screen displayed when an application mode tab 705 in FIG. 7 is pressed down. The user can carry out settings about the reduction layout, color balance, copy-forgery-inhibited pattern and the like.

Figure 9:
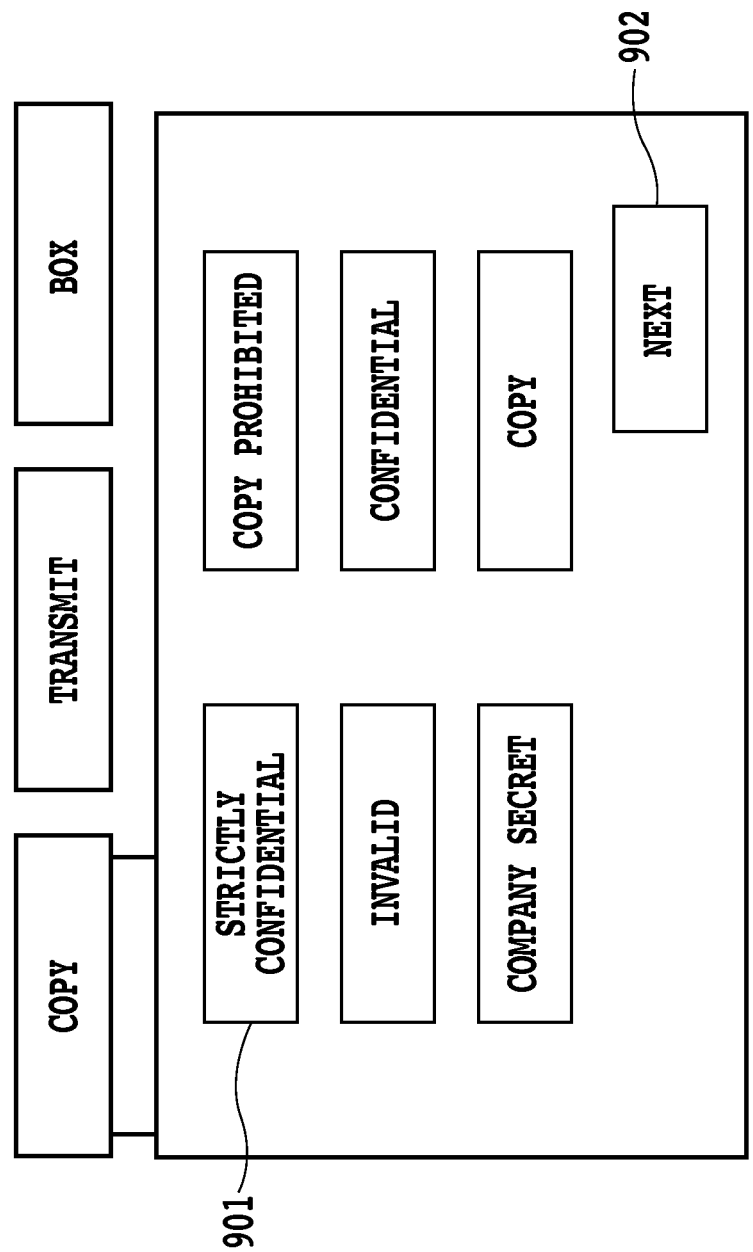
FIG. 9 is a diagram illustrating a setting screen (Part 2) of the copy-forgery-inhibited pattern on the operating section of the image forming apparatus.

FIG. 9 shows a screen displayed when a copy-forgery-inhibited pattern tab 801 in FIG. 8 is pressed down. On this screen, the user can set prescribed character string information (STRICTLY CONFIDENTIAL, COPY PROHIBITED, INVALID, CONFIDENTIAL, COMPANY SECRET, COPY) as the latent image. For example, when the user wants to set "STRICTLY CONFIDENTIAL" as the latent image, he or she can press down a strictly confidential tab 901, followed by pressing down a "NEXT" tab 902.

Figure 10:
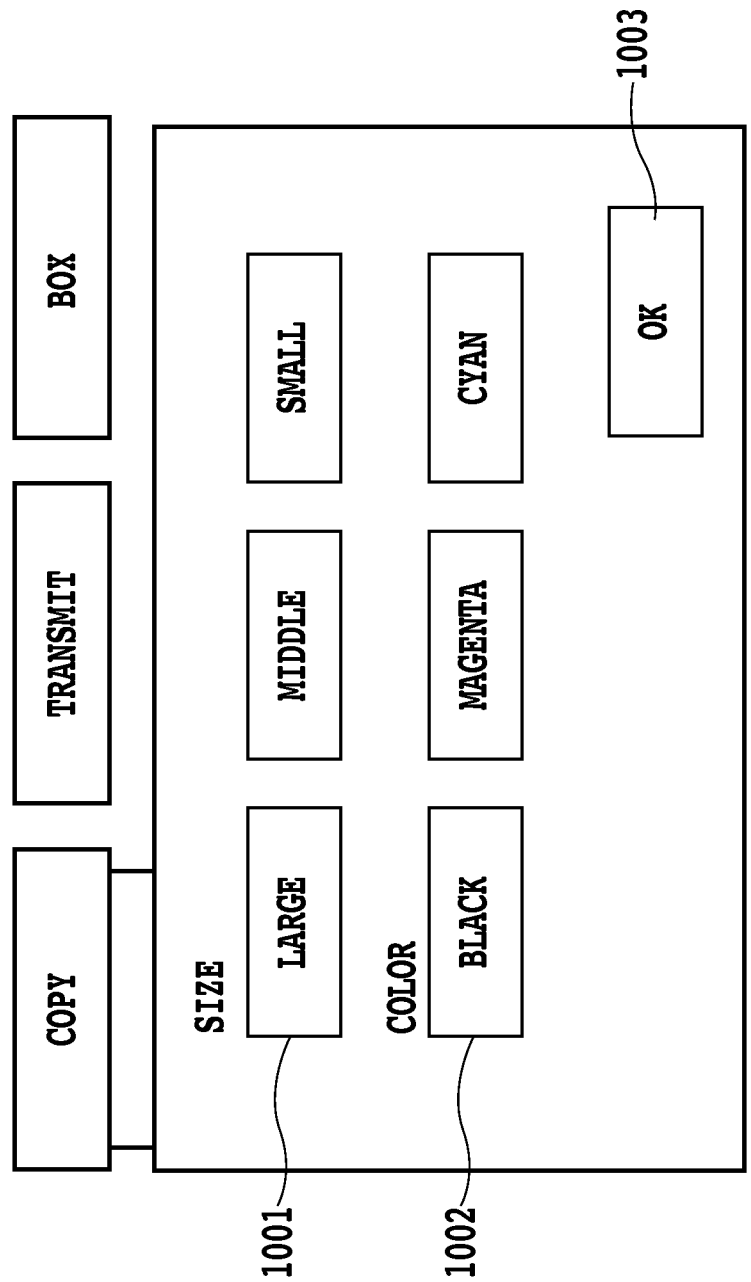
FIG. 10 is a diagram illustrating a setting screen (Part 3) of the copy-forgery-inhibited pattern on the operating section of the image forming apparatus.

FIG. 10 shows a screen displayed when the "NEXT" tab 902 in FIG. 9 is pressed down. On this screen, the user can set the font size and color of the latent image. As the candidates of the font size, there are large, middle and small (1001); and as the candidates of color, there are black, magenta and cyan (1002). When an OK tab 1003 is pressed down after setting the font and color, the copy-forgery-inhibited pattern setting ends.

<Image Forming Processing of Image Data with Copy-forgery-inhibited Pattern>

Figure 11:
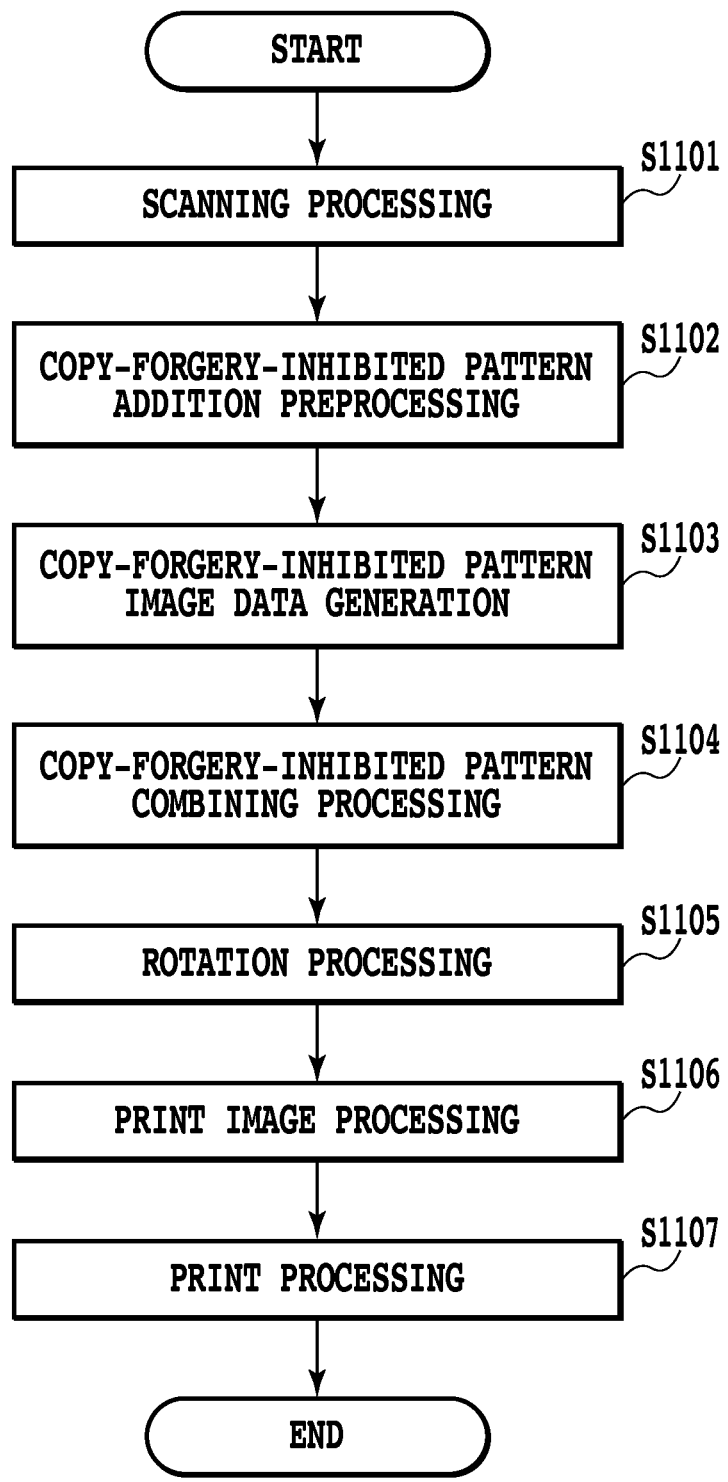
FIG. 11 is a flowchart for explaining the image forming processing of the image data with the copy-forgery-inhibited pattern.

In the following, the processing from combining the source document image data obtained by reading the source document with the copy-forgery-inhibited pattern image data up to forming an image on output paper will be described with reference to the flowchart of FIG. 11.

S1101: Scanning Processing

When the instruction to add the copy-forgery-inhibited pattern to the source document is issued via the operating screen (FIG. 7-FIG. 10 and the like), the scanner section 13 starts the reading processing of the source document. The source document image data generated by the reading processing is delivered to the scanner image processing section 312 to undergo the above-mentioned image processing. The source document image data subjected to the image processing is delivered to the compressing section 313 to be compressed. The compressed source document image data is delivered to the RAM 302 along with the image region data annexed to the source document image data to be stored. The source document image data stored in the RAM 302 consists of a plurality of tile data as described above. The processing so far is the same as the processing described in <Copying Operation>.

S1102: Copy-forgery-inhibited Pattern Addition Preprocessing

The source document image data stored in the RAM 302 is delivered to the decompressing section 318. The decompressing section 318 decompresses the source document image data. The decompressed source document image data is delivered to the color space converting section 322. The color space converting section 322 performs the background removal processing, monochrome generating processing, Log conversion processing, and output color correcting processing on the source document image data. These processings correspond to the processings carried out by the background removal processing section 601, monochrome generating section 602, Log converting section 603, and output color correcting section 604 in FIG. 6. The source document image data subjected to the foregoing processings is delivered to the compressing section 319. The compressing section 319 compresses the source document image data subjected to the image processing by the color space converting section 322. The compressed source document image data is delivered to the RAM 302 to be stored.

S1103: Copy-forgery-inhibited Pattern Image Data Generating Processing

The copy-forgery-inhibited pattern image data generated in the processing that will be described later is stored in the RAM 302 as uncompressed image data. Here, the copy-forgery-inhibited pattern image data is one of the C (Cyan) image data, M (Magenta) image data and K (blacK) image data. Besides, the copy-forgery-inhibited pattern image data stored in the RAM 302 is composed of a plurality of tile data in the same manner as the source document image data. The copy-forgery-inhibited pattern image data generated here takes into account the effect of the rotation of the combined image at the following step S1105. The processing at the current step S1103 will be described in detail later with reference to FIG. 12.

S1104: Copy-forgery-inhibited Pattern Combining Processing

The source document image data stored in the RAM 302 is delivered to the decompressing section 318. The decompressing section 318 decompresses the source document image data. The decompressed source document image data is delivered to the combining section 327. Likewise, the copy-forgery-inhibited pattern image data is delivered to the combining section 327 via the decompressing section 318. The decompressing section 318 does not decompress the copy-forgery-inhibited pattern image data. This is because the copy-forgery-inhibited pattern image data is not compressed from the beginning.

Subsequently, the combining section 327 combines the two image data. Here, since the two image data consist of a plurality of tile data, the image data after combining also consists of a plurality of tile data. The combined image data is delivered to the compressing section 319. The compressing section 319 compresses the combined image data. The combined image data compressed to tile data is delivered to the RAM 302 to be stored.

S1105: Rotating Processing

The combined image data stored in the RAM 302 is delivered to the decompressing section 316. In the course of this, when the rotating section 400 carries out the image rotation, the tiles are rearranged before delivery in such a manner that the order of delivering the tile data agrees with the order after the rotation. The decompressing section 316 decompresses the tile data. The decompressed tile data is delivered to the rotating section 400.

The rotating section 400 performs the image rotation of one of 0 degree (nothing is done in this case), 90 degrees, 180 degrees and 270 degrees on the decompressed tile data. The rotating processing is carried out according to the paper type selected with the paper selection tab 703 of FIG. 7 or the paper output direction of the printer section. In addition, the rotating section 400 rasterizes the image data consisting of a plurality of tile data subjected to the decompression. The rasterized combined image data is delivered to the printer image processing section 315.

S1106: Print Image Processing

Subsequently, the printer image processing section 315 performs the output side gamma correcting processing and the halftone correcting processing on the combined image data. These processings correspond to the processings carried out by the output side gamma correcting section 605 and the halftone correcting section 606 in FIG. 6 described above. On the other hand, the printer image processing section 315 performs none of the background removal processing, monochrome generating processing, Log conversion processing and output color correcting processing. These processings correspond to the processings performed by the background removal processing section 601, the monochrome generating section 602, the Log converting section 603 and the output color correcting section 604 in FIG. 6. Here, the reason for not performing any of the background removal processing, Log conversion processing and output color correcting processing on the combined image data is to prevent the copy-forgery-inhibited pattern image from collapsing in the processing. As for the source document image data, the color space converting section 322 has performed these processings in advance as described above.

S1107: Print Processing

The combined image data subjected to the foregoing processings in the printer image processing section 315 is delivered to the printer section 14 via the printer I/F 314. The printer section 14 forms the image of the combined image data on output paper.

The foregoing is the procedure of the image forming processing at the time of forming the image data having copy-forgery-inhibited pattern (i.e. the combined image) on a sheet.

<Flow of Copy-forgery-inhibited Pattern Image Data Generating Processing>

Figure 12:
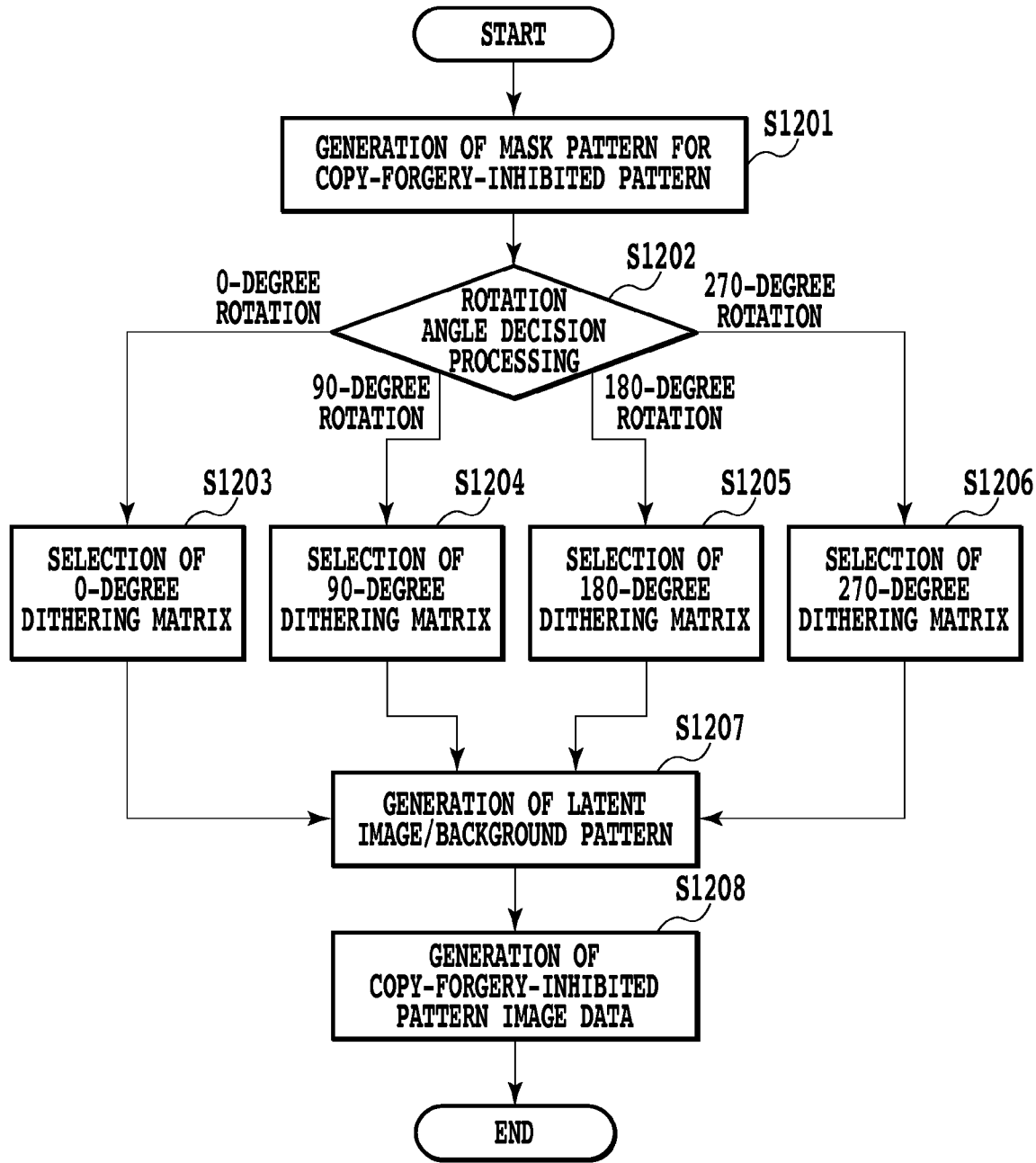
FIG. 12 is a flowchart for explaining the generating processing of the copy-forgery-inhibited pattern image data.
Figure 13:
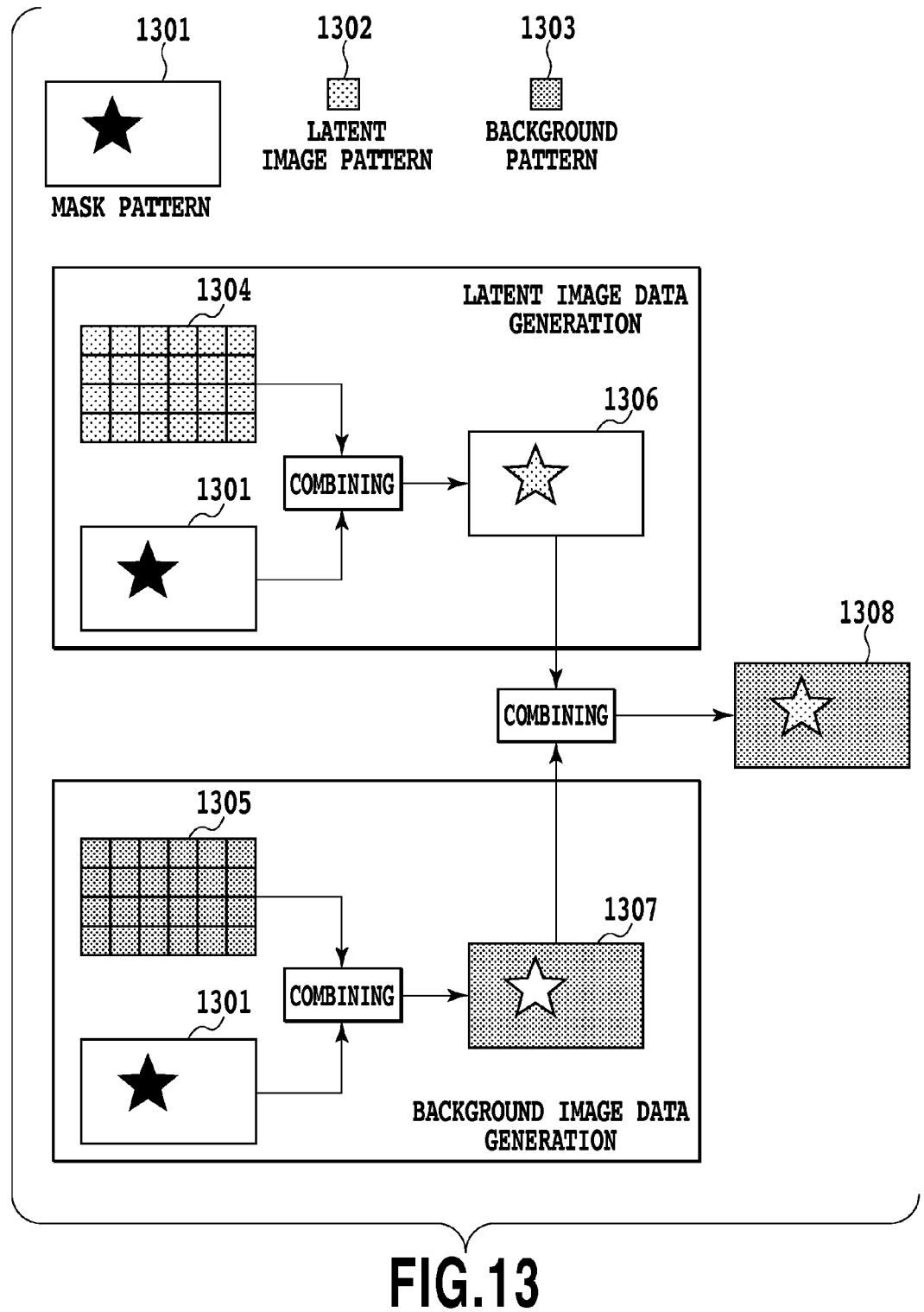
FIG. 13 is a schematic diagram at the time of generating the copy-forgery-inhibited pattern image data.
Figure 14:
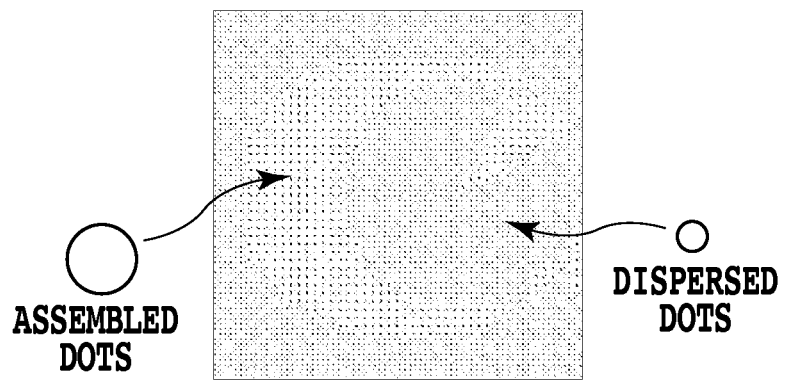
FIG. 14 is a diagram showing a state of dots in the copy-forgery-inhibited pattern image data.

Subsequently, the copy-forgery-inhibited pattern image data generation at step S1103 will be described in detail with reference to the flowchart of FIG. 12 and the schematic diagram about the generation of FIG. 13. In this case, all the generating processing of the copy-forgery-inhibited pattern image data is carried out by software processing on the CPU 301.

S1201: Generation of Mask Pattern for Copy-forgery-inhibited Pattern

A binary mask pattern for the copy-forgery-inhibited pattern is generated by rasterizing a font on the basis of the latent image information (character string information such as STRICTLY CONFIDENTIAL, COPY PROHIBITED and the like) designated by the user. A mask pattern 1301 of FIG. 13 is a schematic diagram when the latent image information is a star mark.

S1202: Rotation Angle Decision Processing

A decision is made of the rotation angle of the combined image data carried out by the rotating processing at the above-mentioned step S1105. Then, according to the decision result, the flow is branched. In the case of the 0 degree rotation (nothing is done in this case), step S1203 is selected. In the case of the 90 degree rotation, step S1204 is selected. In the case of the 180 degree rotation, step S1205 is selected. In the case of the 270 degree rotation, step S1206 is selected.

S1203, S1204, S1205 and S1206: Dithering Matrix Selection

Although the dithering processing is a well-known technique, the background matrix (sometimes called "dithering matrix for generating a background portion") and the latent image matrix (sometimes called "dithering matrix for generating a latent image portion") will be described simply here.

The reference numeral 1701 of FIG. 17A designates a 16×16 background matrix. The reference numeral 1901 of FIG. 19A designates a background pattern generated by applying a background portion generating density level signal value to the background matrix 1701. Gray cells in FIG. 19A are places where dots light up. In addition, the reference numeral 1801 of FIG. 18A designates a 16×16 latent image matrix. The reference numeral 2001 of FIG. 20A designates a latent image pattern generated by applying a latent image generating density level signal value to the latent image matrix 1801. As in the background pattern 1901, gray cells are places where dots light up.

By comparing the background pattern 1901 with the latent image pattern 2001, it is found that the background pattern 1901 has a dispersed dot pattern, and the latent image pattern 2001 has a concentrated dot pattern.

The foregoing description of the dithering processing is completed, and the description returns to the dithering matrix selection.

The HDD 304 stores the background portion generating dithering matrices corresponding to the rotation angle, that is, the background matrices 1701, 1702, 1703 and 1704 shown in FIG. 17A-FIG. 17D, and the background portion generating density level signal value to be applied to the dithering matrices. The background matrix 1701 is a dithering matrix for 0 degree, the background matrix 1702 is for 90 degrees, the background matrix 1703 is for 180 degrees and the background matrix 1704 is for 270 degrees. The angles mentioned here are angles by which the combining image is rotated at step S1105 below.

The reference numerals 1901, 1902, 1903 and 1904 shown in FIG. 19A-FIG. 19D designate the dot patterns generated by applying the background portion generating density level signal value to the background matrices 1701, 1702, 1703 and 1704 shown in FIG. 17A-FIG. 17D, respectively. The present specification refers to the dot patterns, which are generated by thus applying the background portion generating density level signal value to the background matrices, as the background patterns.

Incidentally, it is found that rotating the background pattern 1902 clockwise by 90 degrees, the background pattern 1903 clockwise by 180 degrees, or the background pattern 1904 clockwise by 270 degrees brings them into agreement with the background pattern 1901 (for 0 degree).

In addition, the HDD 304 stores the latent image portion generating dithering matrices corresponding to the rotation angle, that is, the latent image matrices 1801, 1802, 1803 and 1804 shown in FIG. 18A-FIG. 18D, and the latent image portion generating density level signal value to be applied to the dithering matrices. The latent image matrix 1801 is a dithering matrix for 0 degree, the latent image matrix 1802 is for 90 degrees, the latent image matrix 1803 is for 180 degrees and the latent image matrix 1804 is for 270 degrees. The angles mentioned here are angles by which the image is rotated at step S1105 below.

The reference numerals 2001, 2002, 2003 and 2004 shown in FIG. 20A-FIG. 20D designate the dot patterns (latent image patterns) generated by applying the latent image portion generating density level signal value to the latent image matrices 1801, 1802, 1803 and 1804 shown in FIG. 18A-FIG. 18D, respectively. It is found that rotating the latent image pattern 2002 clockwise by 90 degrees, the latent image pattern 2003 clockwise by 180 degrees, or the latent image pattern 2004 clockwise by 270 degrees brings them into agreement with the latent image pattern 2001 (for 0 degree). Thus, the present embodiment selects the dithering matrix as follows.

At S1203, the background matrix 1701 and the latent image matrix 1801 are selected and read from the HDD 304.

At S1204, the background matrix 1702 and the latent image matrix 1802 are selected and read from the HDD 304.

At S1205, the background matrix 1703 and the latent image matrix 1803 are selected and read from the HDD 304.

At S1206, the background matrix 1704 and the latent image matrix 1804 are selected and read from the HDD 304.

Incidentally, although it is assumed in the present embodiment that the HDD 304 stores the four types of the background matrices, it is also possible in practice that the HDD 304 stores only one type of the background matrix and rotates the background matrix whenever necessary.

As for the background portion generating density level signal value and the latent image portion generating density level signal value used at all the steps at which the values are used, the same corresponding ones are read from the HDD 304.

S1207: Latent Image/Background Pattern Generating Processing

Subsequently, the latent image pattern 1302 and the background pattern 1303 of FIG. 13 (both of them are bit map data) are generated by the dithering processing. In other words, the latent image portion generating density level signal value readout is applied to the latent image matrix. Then, the latent image pattern 1302 is generated. Likewise, the background pattern 1303 is generated.

Subsequently, a latent image repeated pattern 1304 and a background repeated pattern 1305 are generated which correspond to patterns formed by repeating the latent image pattern 1302 and the background pattern 1303 by the prescribed number of times.

S1208: Copy-forgery-inhibited Pattern Image Data Generating Processing

A latent image data 1306 is generated from the latent image repeated pattern 1304 and the mask pattern 1301. Here, the portion corresponding to the latent image portion is extracted from the latent image repeated pattern 1304 using the mask pattern 1301. Likewise, the background image data 1307 is generated from the background repeated pattern 1305 and the mask pattern 1301. Then, a copy-forgery-inhibited pattern image data 1308 is generated by combining the generated latent image data 1306 with the generated background image data 1307. The copy-forgery-inhibited pattern image data 1308 thus generated is binary bit map data. To the bit map data, color information of one of CMK is annexed. The color information can be determined either by user setting or from the color information of the source document image data.

Although the present embodiment generates the copy-forgery-inhibited pattern image data using the dithering processing, the present invention is not limited to this. For example, to create the latent image pattern and the background pattern, an error diffusion method or an average density method can also be employed. In this case, as for the dot pattern of the latent image portion and that of the background portion, they are created for each rotation angle in such a manner that after the rotation they agree with the dot pattern without the rotation, and are selected in accordance with the rotation angle of the copy-forgery-inhibited pattern image.

The foregoing is the description of the first embodiment.

The present embodiment creates the copy-forgery-inhibited pattern by selecting the dithering matrices corresponding the rotation angle in such a manner that the array of the elements of the latent image pattern and that of the background pattern agree, when the copy-forgery-inhibited pattern image created from them is rotated, with their counterparts without the rotation. Accordingly, the dot patterns of the latent image portion and background portion of the copy-forgery-inhibited pattern image generated are unchanged and the same as those without the rotation even after the rotation. In other words, generating the copy-forgery-inhibited pattern image data as in the present embodiment makes it possible to always keep equal the density level of the latent image portion to the density level of the background portion of the copy-forgery-inhibited pattern image when drawing them on paper with a printer, thereby being able to prevent the density level difference due to rotation from taking place. Incidentally, as for the flows described in the present embodiment, their order can be exchanged as long as no contradiction occurs.

Second Embodiment

In the present embodiment, the source document image and the mask pattern of the copy-forgery-inhibited pattern are rotated in advance. In this case, a method will be described of solving the above-mentioned problem involved in combining the rotated source document image data with the copy-forgery-inhibited pattern image data generated from the mask pattern rotated.

In the following description, only <Image Forming Processing of Image Data with Copy-forgery-inhibited Pattern> and <Flow of Copy-forgery-inhibited Pattern Image Data Generating Processing> which differ from those of the first embodiment will be described. The remaining processing and the like are the same as the first embodiment described above and their contents are as described above.

<Image Forming Processing of Image Data with Copy-Forgery-inhibited Pattern>

Figure 21:
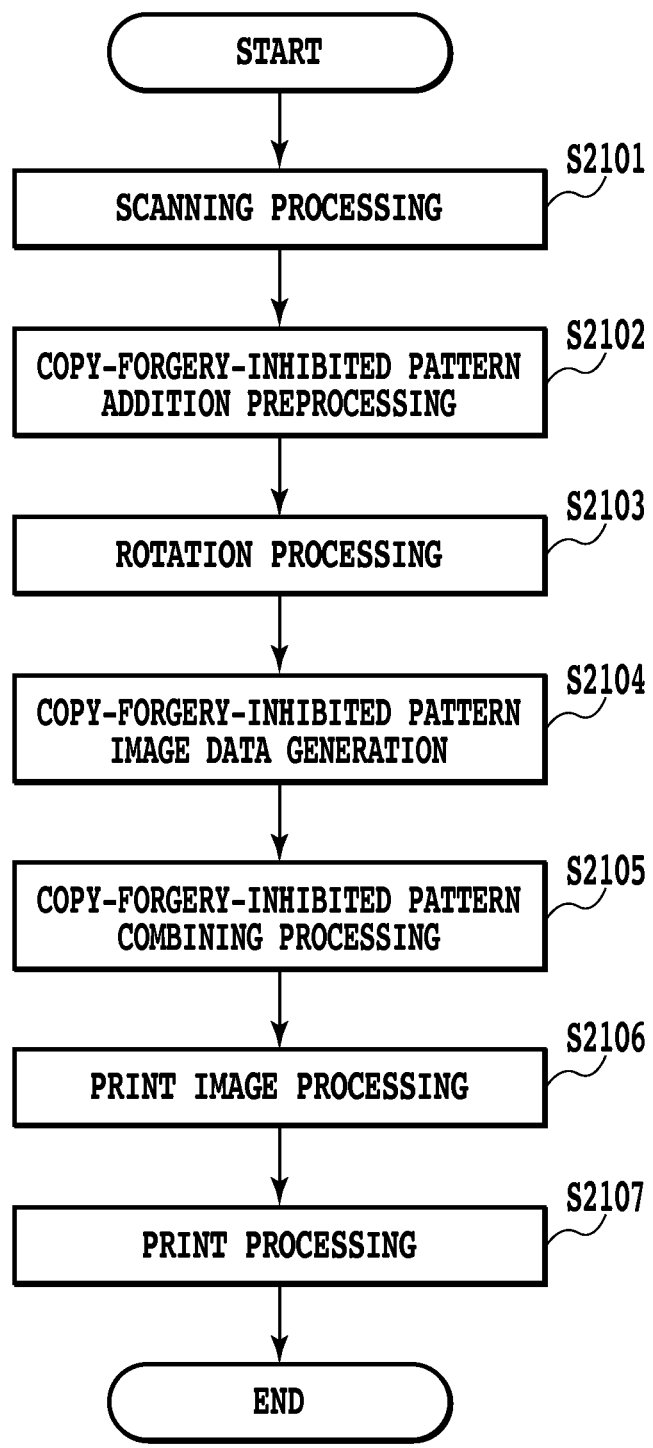
FIG. 21 is a flowchart illustrating the image forming processing of the image data with the copy-forgery-inhibited pattern in a second embodiment in accordance with the present invention.

In the following, the processing from combining the source document image data obtained by reading the source document with the copy-forgery-inhibited pattern image data up to forming an image on output paper will be described with reference to the flowchart of FIG. 21.

S2101: Scanning Processing

When the instruction to add the copy-forgery-inhibited pattern to the source document is issued via the operating screen (FIG. 8-FIG. 10 and the like), the scanner section 13 starts reading the source document. The source document image data generated by the reading processing is delivered to the scanner image processing section 312 to undergo the prescribed image processing. The source document image data subjected to the prescribed image processing is delivered to the compressing section 313 to be compressed. The compressed source document image data is delivered to the RAM 302 along with the image region data annexed to the source document image data to be stored. The source document image data stored in the RAM 302 consists of a plurality of tile data as described above. The processing is the same as the processing at step S1101 of the first embodiment.

S2102: Copy-forgery-inhibited Pattern Addition Preprocessing

The source document image data stored in the RAM 302 is delivered to the decompressing section 318. The decompressing section 318 decompresses the source document image data. The decompressed source document image data is delivered to the color space converting section 322. The color space converting section 322 performs the background removal processing, monochrome generating processing, Log conversion processing, and output color correcting processing on the source document image data. These processings correspond to the processings carried out by the background removal processing section 601, monochrome generating section 602, Log converting section 603, and output color correcting section 604 in FIG. 6. The source document image data subjected to the foregoing processings is delivered to the compressing section 319. The compressing section 319 compresses the source document image data subjected to the image processing by the color space converting section 322. The compressed source document image data is delivered to the RAM 302 to be stored. The processing is the same as the processing at step 1102 of the first embodiment.

S2103: Rotating Processing

The source document image data stored in the RAM 302 is delivered to the decompressing section 318. In the course of this, when the rotating section 320 carries out the image rotation, the tiles are rearranged before delivery in such a manner that the order of delivering the tile data agrees with the order after the rotation. The decompressing section 318 decompresses the tile data. The decompressed tile data is delivered to the rotating section 320. The rotating section 320 performs the image rotation of 0 degree (nothing is done in this case), 90 degrees, 180 degrees, or 270 degrees on the decompressed tile data. The rotating processing is carried out according to the paper type selected with the paper selection tab 703 of FIG. 7 or the paper output direction of the printer section. The rotated source document image data is delivered to the compressing section 319. The compressing section 319 compresses the source document image data. The compressed source document image data is delivered to the RAM 302 to be stored.

S2104: Copy-forgery-inhibited Pattern Image Data Generating Processing

The copy-forgery-inhibited pattern image data generated in the processing that will be described later is stored in the RAM 302 as uncompressed image data. Here, the copy-forgery-inhibited pattern image data is one of the C (Cyan) image data, M (Magenta) image data and K (blacK) image data. Besides, the copy-forgery-inhibited pattern image data stored in the RAM 302 is composed of a plurality of tile data in the same manner as the source document image data. The copyforgery-inhibited pattern image data generated here is the copy-forgery-inhibited pattern image data created using the mask pattern that has already performed the rotation by the binary image rotating section 308 and the like. Combining such copy-forgery-inhibited pattern image data with the source document image data makes it possible to output on paper the copy-forgery-inhibited pattern image with the same direction as the source document image.

S2105: Copy-forgery-inhibited Pattern Combining Processing

The source document image data stored in the RAM 302 is delivered to the decompressing section 318. The decompressing section 318 decompresses the source document image data. The decompressed source document image data is delivered to the combining section 327. Likewise, the copy-forgery-inhibited pattern image data is delivered to the combining section 327 via the decompressing section 318. The decompressing section 318 does not decompress the copy-forgery-inhibited pattern image data. This is because the copy-forgery-inhibited pattern image data is not compressed from the beginning.

The combining section 327 combines the two image data. Here, since the two image data consist of a plurality of tile data, the image data after combining also consists of a plurality of tile data. The combined image data is delivered to the compressing section 319. The compressing section 319 compresses the combined image data. The combined image data compressed to tile data is delivered to the RAM 302 to be stored. The processing is the same as the processing at step S1104 of the first embodiment.

S2106: Print Image Processing

The combined image data stored in the RAM 302 is delivered to the decompressing section 316. The decompressing section 316 decompresses the tile data. The decompressed tile data is delivered to the rotating section 400. The rotating section 400 does not rotate the combining image because the source document image and the copy-forgery-inhibited pattern image included in the combining image have already been rotated. The rotating section 400 rasterizes the image data consisting of the plurality of tile data after the decompression. The rasterized combined image data is delivered to the printer image processing section 315.

Subsequently, the printer image processing section 315 performs the output side gamma correcting processing and the halftone correcting processing on the combined image data. These processings correspond to the processings carried out by the output side gamma correcting section 605 and the halftone correcting section 606 of FIG. 6 described above in the first embodiment. On the other hand, the printer image processing section 315 performs none of the background removal processing, monochrome generating processing, Log conversion processing and output color correcting processing. These processings correspond to the processings performed by the background removal processing section 601, the monochrome generating section 602, the Log converting section 603 and the output color correcting section 604 in FIG. 6. Here, the reason for not performing any of the background removal processing, Log conversion processing and output color correcting processing on the combined image data is to prevent the copy-forgery-inhibited pattern image from collapsing in the processing. As for the source document image data, the color space converting section 322 has performed these processings in advance as described above.

S2107: Print Processing

The combined image data subjected to the foregoing processings in the printer image processing section 315 is delivered to the printer section 14 via the printer I/F 314. The printer section 14 forms the image of the combined image data on output paper. The processing is the same as that of step S1107 of the first embodiment.

The foregoing is the procedure of the image forming processing at the time of forming the image having copy-forgery-inhibited pattern (i.e. the combined image).

Although not described above, it goes without saying that any other processings based on the programs stored in the ROM 303 or HDD 304 can be executed, or any image data stored in the ROM 303 or HDD 304 can be retrieved as needed.

<Flow of Copy-Forgery-Inhibited Pattern Image Data Generating Processing>

Figure 22:
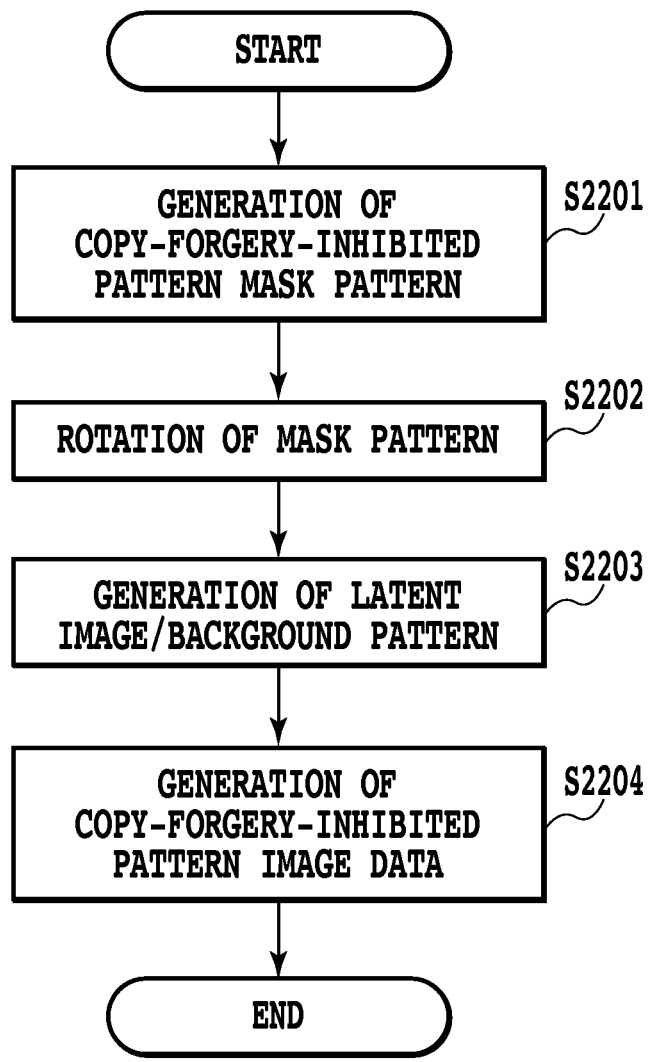
FIG. 22 is a flowchart illustrating the generating processing of the copy-forgery-inhibited pattern image data in the second embodiment.
Figure 23:
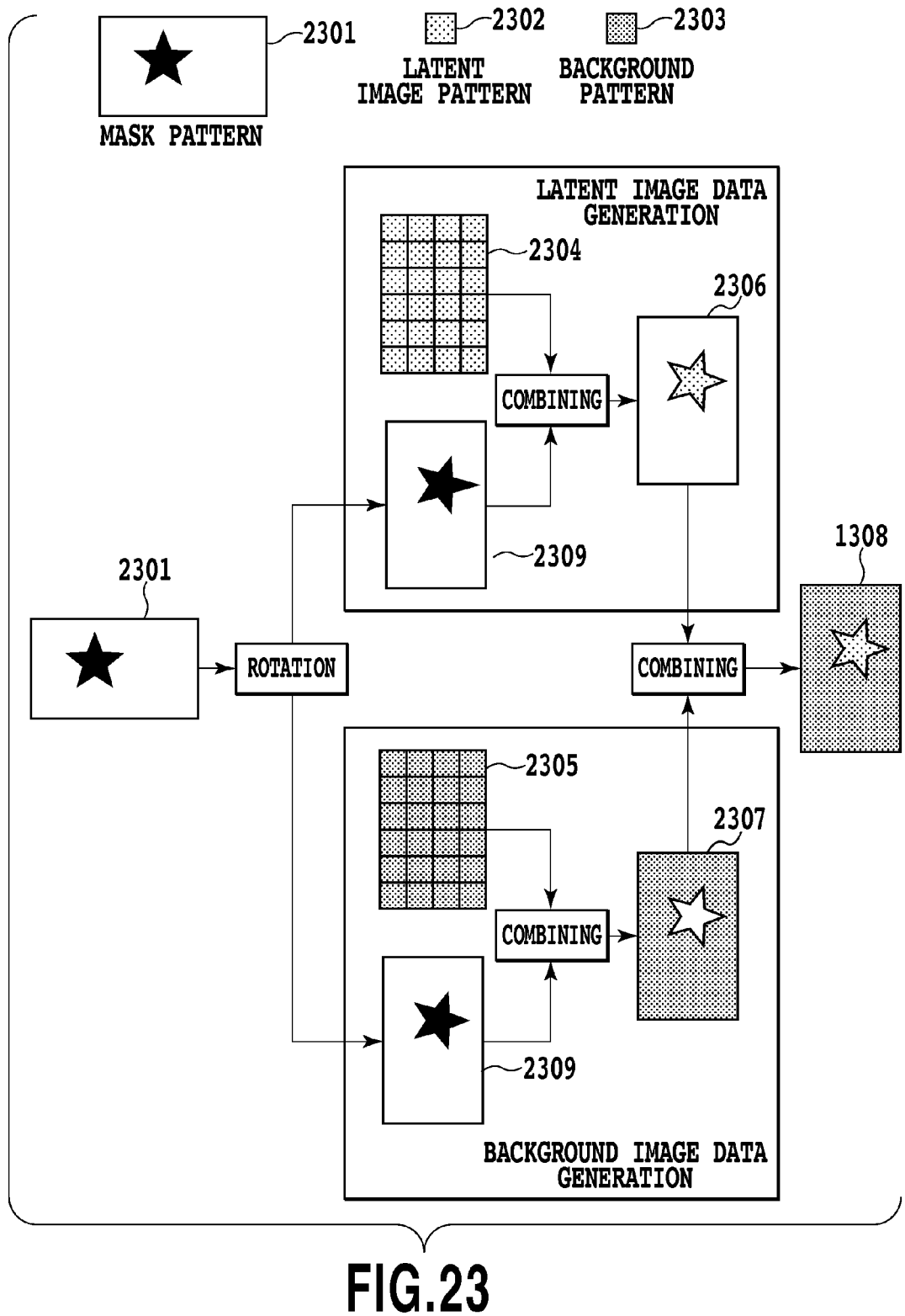
FIG. 23 is a schematic diagram showing the generation of the copy-forgery-inhibited pattern image data in the second embodiment.

Subsequently, the copy-forgery-inhibited pattern image data generating processing at step S2104 will be described in detail with reference to the flowchart of FIG. 22 and the schematic diagram at the time of the generation of FIG. 23. In this case, all the generating processing of the copy-forgery-inhibited pattern image data is carried out by software processing on the CPU 301.

S2201: Generation of Mask Pattern for Copy-forgery-inhibited Pattern

The CPU 301 generates the binary mask pattern for the copy-forgery-inhibited pattern by rasterizing a font on the basis of the latent image information (character string information such as STRICTLY CONFIDENTIAL, COPY PROHIBITED and the like) designated by the user. The mask pattern 2301 of FIG. 23 is a schematic diagram when the latent image information is a star mark.

S2202: Mask Pattern Rotating Processing

At this step, the CPU 301 rotates the mask pattern for copy-forgery-inhibited pattern by the same angle as the rotation angle of the source document image in the rotating processing at step S2103. The mask pattern 2309 of FIG. 23 is an example of carrying out the rotation of 90 degrees at S2103.

S2203: Latent Image/Background Pattern Generating Processing

The HDD 304 stores the background matrix 1701 and the background portion generating density level signal value to be applied to the background matrix 1701. In addition, the HDD 304 stores the latent image matrix 1801 and the latent image portion generating density level signal value to be applied to the latent image matrix 1801. The CPU 301 reads these data from the HDD 304 to perform the following processing.

Subsequently, the latent image pattern 2302 and the background pattern 2303 of FIG. 23 (both of them are bit map data) are generated by the dithering processing. In other words, the CPU 301 applies the latent image portion generating density level signal value read out to the latent image matrix. Then, it generates the latent image pattern 2302 for the latent image portion. Likewise, it generates the background pattern 2303 for the background portion by applying the latent image portion generating density level signal value read out to the background matrix 1701.

Subsequently, patterns (called "latent image repeated pattern 2304" and "background repeated pattern 2305") formed by repeating the latent image pattern 2302 and the background pattern 2303 by a prescribed number of times are respectively generated.

S2204: Copy-forgery-inhibited Pattern Image Data Generating Processing

At this step, the CPU 301 generates latent image data 2306 from the latent image repeated pattern 2304 and the mask pattern 2301. Here, using the mask pattern 2301, the CPU 301 places the latent image repeated pattern 2304 at the portion (region) corresponding to the latent image portion of the copy-forgery-inhibited pattern in the mask pattern 2301. Likewise, the CPU 301 generates background image data 2307 from the mask pattern 2301 and the background repeated pattern 2305. Then, the CPU 301 generates the copy-forgery-inhibited pattern image data 2308 by combining the generated latent image data 2306 with the generated background image data 2307.

The copy-forgery-inhibited pattern image data 2308 thus generated is binary bit map data. To the bit map data, color information of one of CMK is annexed. The color information can be determined either by user setting or from the color information of the source document image data.

Although the present embodiment generates the copy-forgery-inhibited pattern image data using the dithering processing, the present invention is not limited to this. For example, to create the latent image pattern and the background pattern, an error diffusion method or an average density method can also be employed.

The foregoing is the description of the second embodiment.

The present embodiment, on the one hand, rotates the mask pattern of the copy-forgery-inhibited pattern, but on the other hand, generates the copy-forgery-inhibited pattern (latent image pattern and background pattern) from the latent image matrix and background matrix independent of the rotation. Accordingly, the dot pattern of the copy-forgery-inhibited pattern image generated from the copy-forgery-inhibited pattern does not vary in spite of the rotation of the copy-forgery-inhibited pattern image. In other words, generating the copy-forgery-inhibited pattern image data in this manner makes it possible to always equalize the density level of the latent image portion with the density level of the background portion of the copy-forgery-inhibited pattern image when drawing the copy-forgery-inhibited pattern image data on paper with a printer, thereby being able to prevent the occurrence of the density level difference due to rotation. Incidentally, as for the flows described in the present embodiment, their order can be exchanged as long as no contradiction occurs.

Other Embodiments

The present invention is further applicable not only to a system comprising a plurality of devices (such as a computer, an interface unit, a reader and a printer), but also to an apparatus comprising a single device (such as a multifunction machine, a printer, or a facsimile).

In addition, the object of the present invention can be achieved by reading, from a storage medium that stores program codes for implementing the procedures of the flowcharts shown in the foregoing embodiments, the program codes and by executing it with a computer (CPU or MPU) of the system or apparatus. In this case, the program codes itself read from the storage medium implements the functions of the foregoing embodiments. Accordingly, the program codes and the computer readable storage medium that stores/records the program codes constitute the present invention as well.

As the storage medium for supplying the program codes, a floppy disk, a hard disk, an optical disk, a magneto-optical disk, a CD-ROM, a CD-R, a magnetic tape, a nonvolatile memory card, a ROM and the like can be used.

Besides, as for the functions of the foregoing embodiments, a computer that executes the program codes it reads out can implement them. The term "executing the program" includes the case where an OS and the like working on the computer according to the instructions of the program codes performs part or all of the actual processing.

Furthermore, the functions of the foregoing embodiments can also be implemented by an expansion board inserted into a computer or by an expansion unit connected to a computer. In this case, the program codes read out of the storage medium are written into a memory in the expansion board inserted to the computer or into a memory in the expansion unit connected to the computer. After that, according to the instructions of the program codes, the CPU in the expansion board or in the expansion unit executes part or all of the actual processing. Thus, the processing by the expansion board or expansion unit can implement the functions of the foregoing embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-175415, filed Jul. 3, 2007, which is hereby incorporated by reference herein in its entirety.

What is claimed is:

1. A printing apparatus comprising a printing unit configured to print images on paper and to output the paper on which the images have been printed, the printing apparatus comprising;
   a generating unit configured to generate copy-forgery-inhibited pattern image data; and
   a rotation unit configured to rotate the generated copy-forgery-inhibited pattern image data in accordance with an output direction of paper,
   wherein the printing unit prints the generated and rotated copy-forgery-inhibited pattern image data or the generated and non-rotated copy-forgery-inhibited pattern image data on paper and outputs, in accordance with an output direction of the paper, the paper on which the generated and rotated copy-forgery-inhibited pattern image data or the generated and non-rotated copy-forgery-inhibited pattern image data has been printed,
   wherein the generating unit includes plural dithering matrices for generating copy-forgery-inhibited pattern image data, and
   wherein the plural dithering matrices include dithering matrices used for generating copy-forgery-inhibited pattern image data to be rotated by the rotation unit and dithering matrices used for generating copy-forgery-inhibited pattern image data not to be rotated by the rotation unit.

2. The printing apparatus as claimed in claim 1, wherein the copy-forgery-inhibited pattern image data to be rotated by the rotation unit is generated so that a dot pattern of the rotated copy-forgery-inhibited pattern image data agrees with a dot pattern of the copy-forgery-inhibited pattern image data not to be rotated by the rotation unit.

3. The printing apparatus as claimed in claim 2, wherein the generating unit selects a dithering matrix for generating a latent image portion and a dithering matrix for generating a background portion, and generates the copy-forgery-inhibited pattern image data from a dot pattern of the latent image portion and a dot pattern of the background portion of the copy-forgery-inhibited pattern generated using the selected dithering matrix for generating the latent image portion and the selected dithering matrix for generating the background portion.

4. The printing apparatus as claimed in claim 3, wherein the copy-forgery-inhibited pattern image data is rotated by the rotation unit after having been combined with source document image data.

5. An image processing method, implemented by a printing apparatus, the printing apparatus comprising a printing unit that prints images on paper and outputs the paper on which the images have been printed, the method comprising:
- a generating step of generating copy-forgery-inhibited pattern image data; and
- a rotation step of rotating the generated copy-forgery-inhibited pattern image data in accordance with an output direction of paper,
- wherein the printing unit prints the generated and rotated copy-forgery-inhibited pattern image data or the generated and non-rotated copy-forgery-inhibited pattern image data on paper and outputs, in accordance with an output direction of the paper, the paper on which the generated and rotated copy-forgery-inhibited pattern image data or the generated and non-rotated copy-forgery-inhibited pattern image data has been printed,
- wherein plural dithering matrices are adapted for generating copy-forgery-inhibited pattern image data in the generating step, and
- wherein the plural dithering matrices include dithering matrices used for generating copy-forgery-inhibited pattern image data to be rotated in the rotation step and dithering matrices used for generating copy-forgery-inhibited pattern image data not to be rotated in the rotation step.

6. The image processing method as claimed in claim 5, wherein the copy-forgery-inhibited pattern image data to be rotated in the rotation step is generated so that its dot pattern of the rotated copy-forgery-inhibited pattern image data agrees with a dot pattern of the copy-forgery-inhibited pattern image data not to be rotated in the rotation step.

7. The image processing method as claimed in claim 6, wherein the generating step comprises:
- a step of selecting a dithering matrix for generating a latent image portion and a dithering matrix for generating a background portion; and
- a step of generating the copy-forgery-inhibited pattern image data from a dot pattern of the latent image portion and a dot pattern of the background portion of the copy-forgery-inhibited pattern generated using the selected dithering matrix for generating the latent image portion and the selected dithering matrix for generating the background portion.

8. The image processing method as claimed in claim 7, wherein the copy-forgery-inhibited pattern image data is rotated in the rotation step after having been combined with source document image data.

9. A non-transitory computer readable medium storing a computer program for causing a computer to function as a printing apparatus, the printing apparatus comprising:
- a printing unit configured to print images on paper and to output the paper on which the images have been printed;
- a generating unit configure to generate copy-forgery-inhibited pattern image data; and
- a rotation unit configured to rotate the generated copy-forgery-inhibited pattern image data in accordance with an output direction of paper,
- wherein the printing unit prints the generated and rotated copy-forgery-inhibited pattern image data or the generated and non-rotated copy-forgery-inhibited pattern image data on paper and outputs, in accordance with an output direction of the paper, the paper on which the generated and rotated copy-forgery-inhibited pattern image data or the generated and non-rotated copy-forgery-inhibited pattern image data has been printed,
- wherein the generating unit includes plural dithering matrices for generating copy-forgery-inhibited pattern image data, and
- wherein the plural dithering matrices include dithering matrices used for generating copy-forgery-inhibited pattern image data to be rotated by the rotation unit and dithering matrices used for generating copy-forgery-inhibited pattern image data not to be rotated by the rotation unit.

* * * * *